US010360395B2

(12) United States Patent
Fiske

(10) Patent No.: US 10,360,395 B2
(45) Date of Patent: *Jul. 23, 2019

(54) HIDING INFORMATION IN NOISE

(71) Applicant: FISKE SOFTWARE LLC, San Francisco, CA (US)

(72) Inventor: Michael Stephen Fiske, San Francisco, CA (US)

(73) Assignee: Fiske Software, LLC, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/953,300

(22) Filed: Nov. 28, 2015

(65) Prior Publication Data

US 2016/0154966 A1    Jun. 2, 2016

Related U.S. Application Data

(60) Provisional application No. 62/092,795, filed on Dec. 16, 2014, provisional application No. 62/085,338, filed on Nov. 28, 2014.

(51) Int. Cl.
*H04L 9/06* (2006.01)
*G06F 21/60* (2013.01)
(Continued)

(52) U.S. Cl.
CPC ........ *G06F 21/606* (2013.01); *G06F 21/6263* (2013.01); *H04L 9/0618* (2013.01);
(Continued)

(58) Field of Classification Search
CPC . G06F 21/606; G06F 21/6263; H04L 9/0869; H04L 63/061; H04L 63/0428;
(Continued)

(56) References Cited

U.S. PATENT DOCUMENTS 8,615,087 B2 * 12/2013 DiCrescenzo ........... H04K 1/04
380/287
9,306,739 B1 * 4/2016 Troupe .................. H04L 9/0852
(Continued)

OTHER PUBLICATIONS

Wikipedia, Hardware Random Number Generator, 2018, Wikipedia, pp. 1-9.*

*Primary Examiner* — Joseph P Hirl
*Assistant Examiner* — Stephen T Gundry
(74) *Attorney, Agent, or Firm* — David Lewis

(57) ABSTRACT

A process of hiding a key or data inside of random noise is introduced, whose purpose is to protect the privacy of the key or data. In some embodiments, the random noise is produced by quantum randomness, using photonic emission with a light emitting diode. When the data or key generation and random noise have the same probability distributions, and the key size is fixed, the security of the hiding can be made arbitrarily close to perfect secrecy, by increasing the noise size. The hiding process is practical in terms of infrastructure and cost, utilizing the existing TCP/IP infrastructure as a transmission medium, and using light emitting diode(s) and a photodetector in the random noise generator. In some embodiments, symmetric cryptography encrypts the data before the encrypted data is hidden in random noise, which substantially amplifies the computational complexity.

59 Claims, 17 Drawing Sheets

(51) Int. Cl.
*H04L 9/32* (2006.01)
*H04L 29/06* (2006.01)
*H04L 9/08* (2006.01)
*G06F 21/62* (2013.01)

(52) U.S. Cl.
CPC .......... *H04L 9/0869* (2013.01); *H04L 9/3236* (2013.01); *H04L 63/0428* (2013.01); *H04L 63/061* (2013.01); *H04L 2209/16* (2013.01)

(58) Field of Classification Search
CPC .. H04L 9/3236; H04L 9/0618; H04L 2209/16
See application file for complete search history.

(56) References Cited

U.S. PATENT DOCUMENTS

| | | | | |
|---|---|---|---|---|
| 9,461,987 B2* | 10/2016 | Panging | | H04L 63/083 |
| 9,882,879 B1* | 1/2018 | Dotan | | H04L 63/0428 |
| 2005/0152540 A1* | 7/2005 | Barbosa | | H04L 9/0858 380/28 |
| 2007/0079123 A1* | 4/2007 | Iwamura | | H04L 63/061 713/171 |
| 2007/0099597 A1* | 5/2007 | Arkko | | H04L 9/3236 455/411 |
| 2009/0003701 A1* | 1/2009 | Rekhi | | G06T 1/0021 382/176 |
| 2009/0161870 A1* | 6/2009 | Rosenberg | | G06F 21/6218 380/268 |
| 2009/0323718 A1* | 12/2009 | Oren-Dahan | | H04L 63/029 370/466 |
| 2010/0034377 A1* | 2/2010 | Kamel Ariffin | | H04L 9/001 380/46 |
| 2010/0046755 A1* | 2/2010 | Fiske | | H04L 9/0822 380/256 |
| 2010/0067701 A1* | 3/2010 | Patwari | | H04L 9/0838 380/279 |
| 2010/0080386 A1* | 4/2010 | Donnangelo | | H04L 1/0009 380/256 |
| 2011/0055585 A1* | 3/2011 | Lee | | H04L 9/0844 713/183 |
| 2011/0085666 A1* | 4/2011 | Hicks | | H04L 9/0852 380/278 |
| 2011/0274273 A1* | 11/2011 | Fiske | | G06F 21/32 380/46 |
| 2011/0280397 A1* | 11/2011 | Patwar | | H04L 63/06 380/44 |
| 2011/0280405 A1* | 11/2011 | Habif | | H04B 10/70 380/278 |
| 2012/0045053 A1* | 2/2012 | Qi | | G06F 7/588 380/252 |
| 2012/0121080 A1* | 5/2012 | Kerschbaum | | H04L 9/085 380/28 |
| 2012/0195428 A1* | 8/2012 | Wellbrock | | H04L 9/0855 380/255 |
| 2012/0221615 A1* | 8/2012 | Cerf | | G06F 7/588 708/250 |
| 2012/0300925 A1* | 11/2012 | Zaverucha | | H04L 51/00 380/46 |
| 2013/0042111 A1* | 2/2013 | Fiske | | H04L 9/3239 713/170 |
| 2013/0089204 A1* | 4/2013 | Kumar | | H04L 9/0852 380/256 |
| 2013/0132723 A1* | 5/2013 | Gaborit | | H04L 9/304 713/171 |
| 2013/0163759 A1* | 6/2013 | Harrison | | H04L 9/0852 380/268 |
| 2013/0251145 A1* | 9/2013 | Lowans | | H04L 9/0838 380/44 |
| 2013/0315395 A1* | 11/2013 | Jacobs | | H04L 9/0852 380/278 |
| 2013/0329886 A1* | 12/2013 | Kipnis | | H04L 9/30 380/255 |
| 2014/0025952 A1* | 1/2014 | Marlow | | H04L 63/0428 713/168 |
| 2014/0098955 A1* | 4/2014 | Hughes | | H04K 1/02 380/256 |
| 2014/0126766 A1* | 5/2014 | Crisan | | G09C 5/00 382/100 |
| 2014/0201536 A1* | 7/2014 | Fiske | | H04L 9/0844 713/183 |
| 2014/0270165 A1* | 9/2014 | Durand | | H04L 9/0869 380/46 |
| 2014/0331050 A1* | 11/2014 | Armstrong | | H04L 9/0855 713/171 |
| 2014/0372812 A1* | 12/2014 | Lutkenhaus | | H04L 9/0855 714/57 |
| 2015/0106623 A1* | 4/2015 | Holman | | H04L 63/0457 713/171 |
| 2015/0188701 A1* | 7/2015 | Nordholt | | H04L 9/0852 713/171 |
| 2015/0295707 A1* | 10/2015 | Howe | | H04L 9/0858 380/28 |
| 2015/0295708 A1* | 10/2015 | Howe | | H04L 9/0858 380/28 |
| 2015/0326392 A1* | 11/2015 | Cheng | | H04L 9/30 380/28 |
| 2016/0034682 A1* | 2/2016 | Fiske | | H04L 63/08 726/19 |
| 2016/0112192 A1* | 4/2016 | Earl | | H04L 9/0858 380/44 |
| 2016/0117149 A1* | 4/2016 | Caron | | G06F 7/588 708/255 |
| 2016/0234017 A1* | 8/2016 | Englund | | H04B 10/70 |
| 2016/0295403 A1* | 10/2016 | Hwang | | H04L 9/065 |
| 2016/0380765 A1* | 12/2016 | Hughes | | H04K 1/02 380/256 |

\* cited by examiner

FIG. 5 — Hidden Key

FIG. 6    Hidden Data

FIG. 7  Somewhat Biased

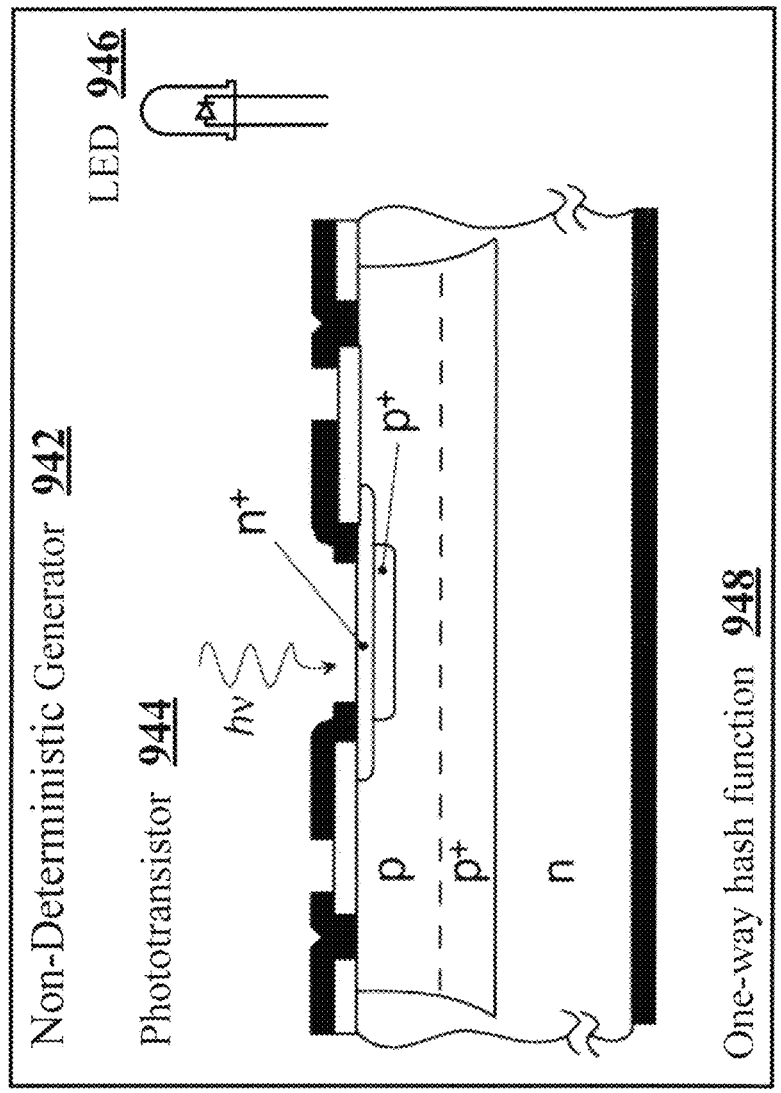

FIG. 13

Eve sees $(m,n)$ scatter $S = (s_1 \ldots s_n)$

| Event Name | Event Probability | Event Description |
|---|---|---|
| $B_{i,j}$ | $2^{-m}$ | $k_1 k_2 \ldots k_m$ is the $i$th data in $E_{j,m}$ |
| $R_i$ | $\binom{\rho}{i} 2^{-\rho}$ | $\eta_1(r_1 r_2 \ldots r_\rho) = i$ |
| $A_i$ | $\binom{n}{i} 2^{-n}$ | $\eta_1(s_1 \ldots s_n) = i$ |

HIDING INFORMATION IN NOISE

1 RELATED APPLICATIONS

This application claims priority benefit of U.S. Provisional Patent Application Ser. No. 62/085,338, entitled "Hiding Data Transmissions in Random Noise", filed Nov. 28, 2014, which is incorporated herein by reference; this application claims priority benefit of U.S. Provisional Patent Application Ser. No. 62/092,795, entitled "Hiding Data Transmissions in Random Noise", filed Dec. 16, 2014, which is incorporated herein by reference.

2 BACKGROUND—FIELD OF INVENTION

The present invention relates broadly to protecting the privacy of information and devices. The processes and device are generally used to maintain the privacy of information transmitted through communication and transmission systems. For example, the hiding processes may be used to protect the metadata of a phone call; in some embodiments, the phone call may be transmitted via voice over IP (internet protocol) with a mobile phone. These processes and devices also may be used to hide passive data stored on a computer or another physical device such as a tape drive. In some embodiments, symmetric cryptographic methods and machines are also used to supplement the hiding process.

Typically, the information (data) is hidden by a sending agent, called Alice. Alice transmits the hidden data to a receiving agent, called Bob. The receiving agent, Bob, applies an extraction process or device. The output of this extraction process or device is the same information (data) that Alice gathered before hiding and sending it. Eve is the name of the agent who is attempting to obtain the information or data. One of Alice and Bob's primary objectives is to assure that Eve cannot capture the private information that was hidden and transmitted between them.

3 BACKGROUND—PRIOR ART

The subject matter discussed in this background section should not be assumed to be prior art merely as a result of its mention in the background section. Similarly, a problem mentioned in the background section or associated with the subject matter of the background section should not be assumed to have been previously recognized in the prior art. The subject matter in the Summary and some Advantages of Invention section represents different approaches, which in and of themselves may also be inventions, and various problems, which may have been first recognized by the inventor.

In information security, a fundamental problem is for a sender, Alice, to securely transmit a message M to a receiver, Bob, so that the adversary, Eve, receives no information about the message. In Shannon's seminal paper [2], his model assumes that Eve has complete access to a public, noiseless channel: Eve sees an identical copy of ciphertext C that Bob receives, where C(M,K) is a function of message M lying in message space $\mathcal{M}$ and secret key K lying in key space $\mathcal{K}$.

In this specification, the symbol P will express a probability. The expression P(E) is the probability that event E occurs and it satisfies $0 \leq P(E) \leq 1$. For example, suppose the sample space is the 6 faces of die and E is the event of rolling a 1 or 5 with that die and each of the 6 faces is equally likely. Then $P(E) = 2/6 = 1/3$. The conditional probability $$P(A|B) = \frac{P(A \cap B)}{P(B)}.$$

$P(A \cap B)$ is probability that event A occurs and also event B occurs. The conditional probability $P(A|B)$ expresses the probability that event A will occur, under the condition that someone knows event B already occurred. The expression that follows the symbol "|" represents the conditional event. Events A and B are independent if $P(A \cap B) = P(A)P(B)$.

Expressed in terms of conditional probabilities, Shannon [2] defined a cryptographic method to be perfectly secret if P(M)=P(M|Eve sees ciphertext C) for every cipher text C and for every message M in the message space $\mathcal{M}$. In other words, Eve has no more information about what the message M is after Eve sees ciphertext C pass through the public channel. Shannon showed for a noiseless, public channel that the entropy of the keyspace $\mathcal{K}$ must be at least as large as the message space $\mathcal{M}$ in order to achieve perfect secrecy.

Shannon's communication secrecy model [2] assumes that message sizes in the message space are finite and the same size. Shannon's model assumes that the transformations (encryption methods) on the message space are invertible and map a message of one size to the same size. Shannon's model assumes that the transformation applied to the message is based on the key. In the prior art, there is no use of random noise that is independent of the message or the key. In the prior art, there is no notion of being able to send a hidden or encrypted message inside the random noise where Eve is not necessarily revealed the size of the message. In the prior art, there is no notion of using random noise to hide the secret channel and transmitting a key inside this channel that is indistinguishable from the noise.

Quantum cryptography was introduced by Weisner and eventually published by Bennett, Brassard, et al. [3, 4]. Quantum cryptography based on the uncertainty principle of quantum physics: by measuring one component of the polarization of a photon, Eve irreversibly loses her ability to measure the orthogonal component of the polarization. Unfortunately, this type of cryptography requires an expensive physical infrastructure that is challenging to implement over long distances [5, 6]. Furthermore, Alice and Bob still need a shared, authentication secret to successfully perform this quantum cryptography in order to assure that Eve cannot corrupt messages about the polarization bases, communicated on Alice and Bob's public channel.

4 SUMMARY AND SOME ADVANTAGES OF THE INVENTION(S)

In some parts of the prior art, conventional wisdom believes that hiding data in the open cannot provide adequate information security. The invention(s), described herein, demonstrate that our process of hiding data inside noise is quite effective. A process for hiding data inside of random noise is demonstrated and described. In some embodiments, the data hidden is a key. In some embodiments, the data hidden is a public key. In some embodiments, the data hidden is encrypted data. In some embodiments, the data hidden is encrypted data that was first encrypted by a block cipher. In some embodiments, the data hidden is encrypted data that was first encrypted by a stream cipher. In some embodiments, the hidden data may be hidden metadata that is associated with the TCP/IP infrastructure [1] used to transmit information.

The inventions) described herein are not bound to Shannon's limitations [2] because they use noise, rather than seek to eliminate noise. When the data generation and random noise have a uniform probability distribution, and the key size is fixed, the security of the key transmission can be made arbitrarily close to perfect secrecy—where arbitrarily close is defined in section 7.9—by increasing the noise size. The processes, devices and machines described herein are practical; they can be implemented with current TCP/IP infrastructure acting as a transmission medium and a random noise generator providing the random noise and key generation.

5 ADVANTAGES AND FAVORABLE PROPERTIES

Overall, our invention(s) that hide data and keys inside random noise exhibits the following favorable security properties.

The hiding process is $O(n)$.

For a fixed key size m bits and $\rho = n-m$ bits of random noise, as $\rho \to \infty$, the security of the hidden data can be made arbitrarily close to perfect secrecy. In some applications, the key size can also be kept secret and is not revealed to Eve.

From the binomial distribution, the closeness to perfect secrecy can be efficiently computed.

The scatter map a can reused when both the key generation and noise generation have a uniform probability distribution and a new random key and new noise are created for each transmission.

The reuse property enables a practical process of hiding data that is first encrypted by a block or stream cipher. The complexity of finding this hidden encrypted data can be substantially greater than the computational complexity of the underlying block or stream cipher. See section 7.12.

Our hiding process uses a noiseless, public channel, which means it can implemented with our current Transmission Control Protocol/Internet Protocol internet infrastructure (TCP/IP). No expensive, physical infrastructure is needed to create noisy channels or transmit and maintain polarized photons, as is required by the prior art of quantum cryptography. Random noise generators are commercially feasible and inexpensive. A random noise generator that produces more than 10,000 random bits per second can be manufactured in high volume for less than three U.S. dollars per device.

Alice and Bob possess their sources of randomness. This system design decentralizes the security to each user. Decentralization helps eliminate potential single points of failure, and backdoors in the transmission medium that may be outside the inspection and control of Alice and Bob.

6 DESCRIPTION OF FIGURES

In the following figures, although they may depict various examples of the invention, the invention is not limited to the examples depicted in the figures.

FIG. 9A shows an embodiment of a non-deterministic generator, based on quantum randomness. Non-deterministic generator 942 is based on the behavior of photons to help generate noise and in some embodiments one or more keys. Non-deterministic generator 942 contains a light emitting diode 946 that emits photons and a phototransistor 944 that absorbs photons.

Figure 9B:
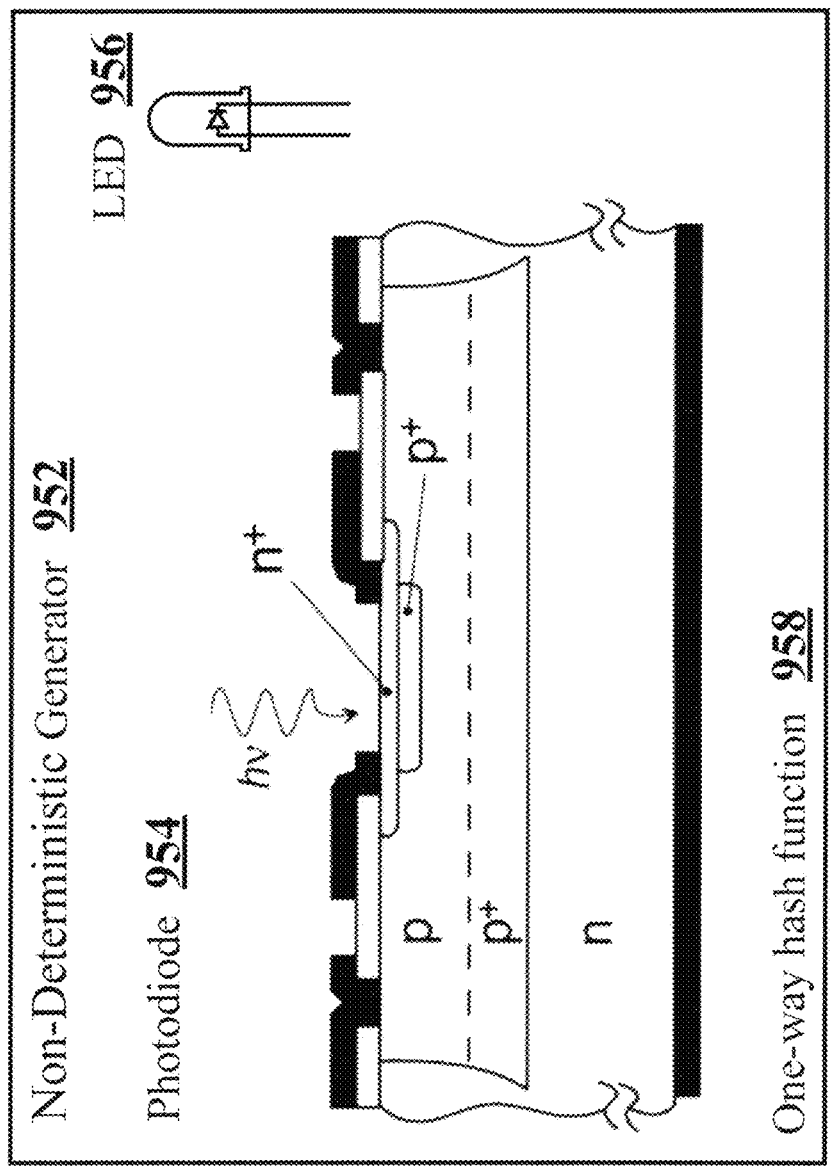

FIG. 9B shows an embodiment of a non-deterministic generator, based on quantum randomness. Non-deterministic generator 952 is based on the behavior of photons to help generate noise and in some embodiments one or more keys. Non-deterministic generator 952 contains a light emitting diode 956 that emits photons and a phototdiode 954 that absorbs photons.

Figure 9C:
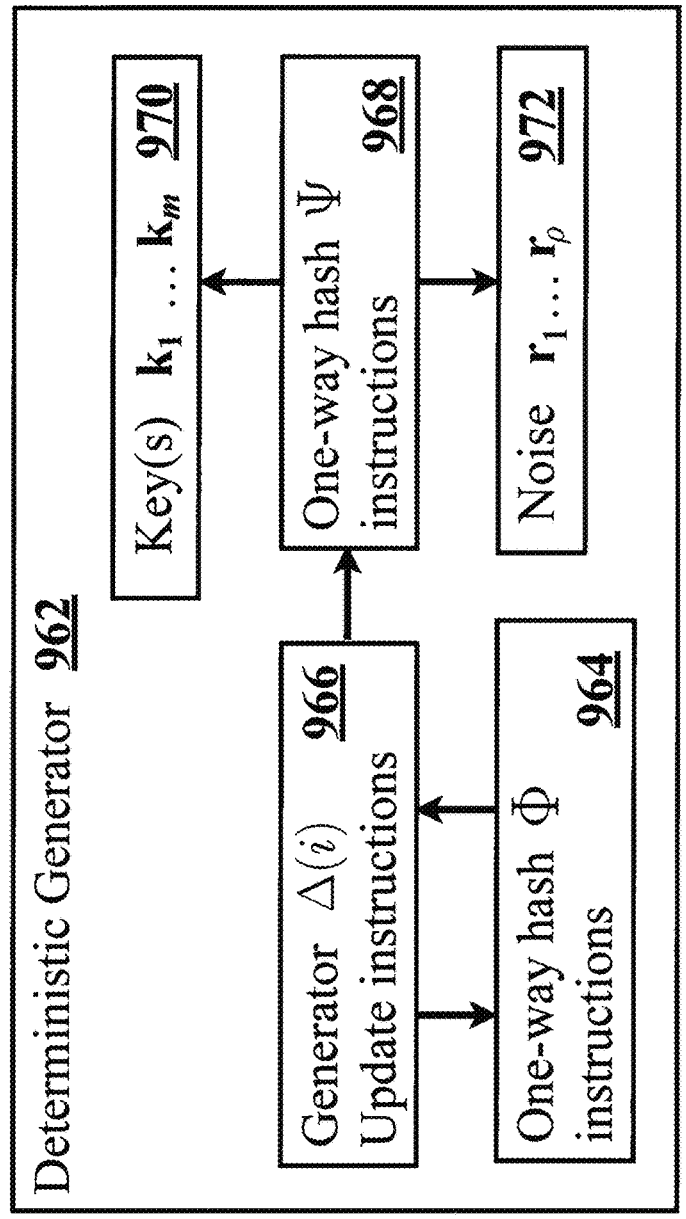

FIG. 9C shows an embodiment of a deterministic generator 962, implemented with a machine. Deterministic generator 962 may generate one or more keys 970 or noise 972. Deterministic generator 962 has generator update instructions 966, one-way hash instructions 964 and one-way hash instructions 968.

Figure 10:
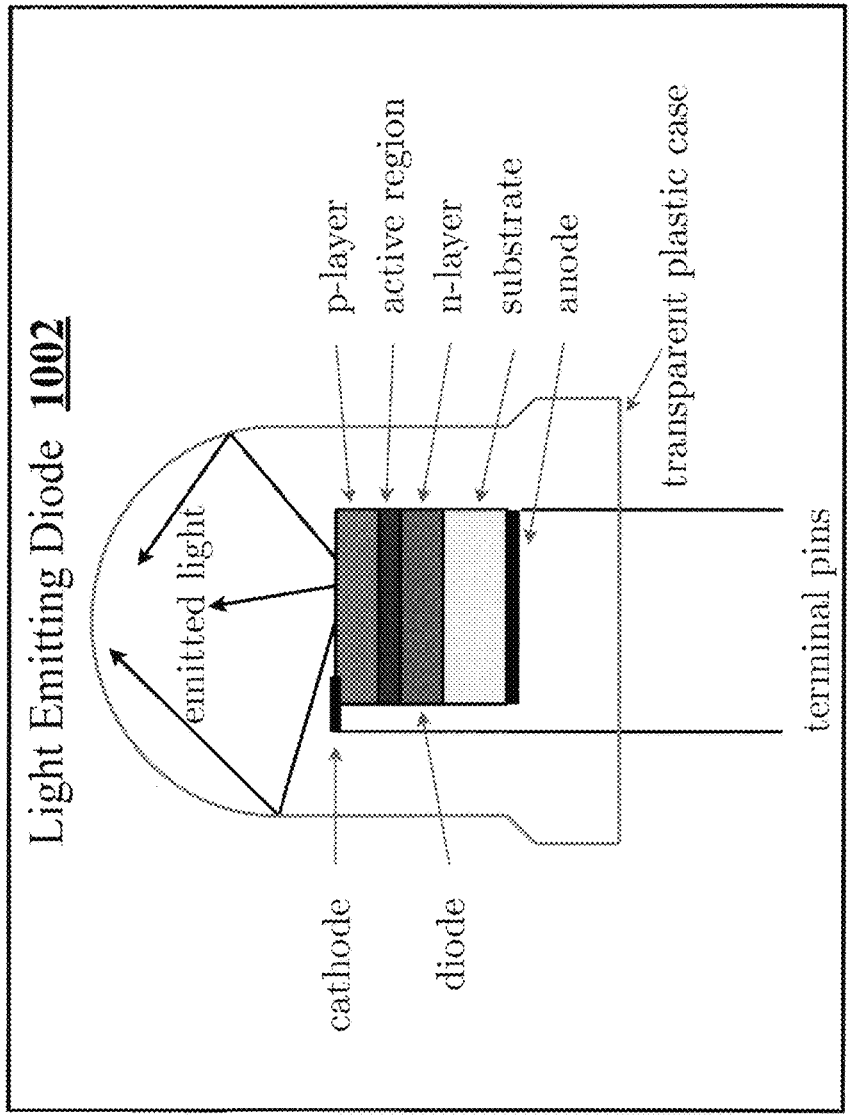

FIG. 10 shows a light emitting diode, which emits photons and in some embodiments is part of the random number generator. The light emitting diode contains a cathode, a diode, an anode, one terminal pin connected to the cathode and one terminal pin connected to the anode, a p-layer of semiconductor, an active region, an n-layer of semiconductor, a substrate and a transparent plastic case.

Figure 11:
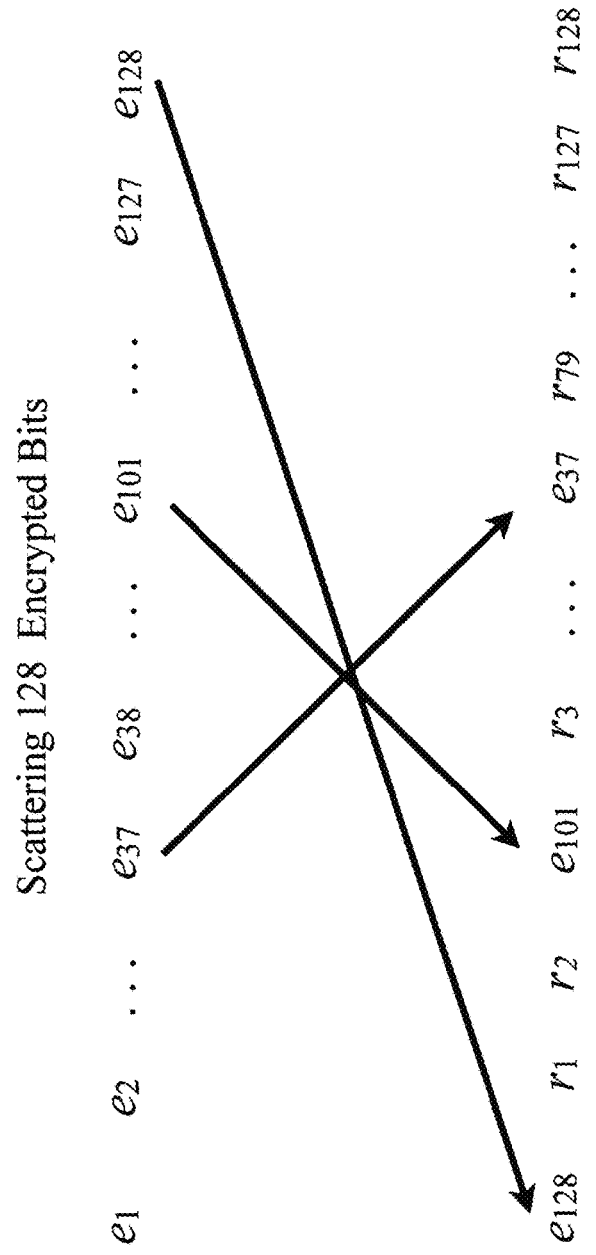

FIG. 11 shows a scatter map that hides 128 bits of encrypted data inside of 128 bits of random noise.

Figure 12:
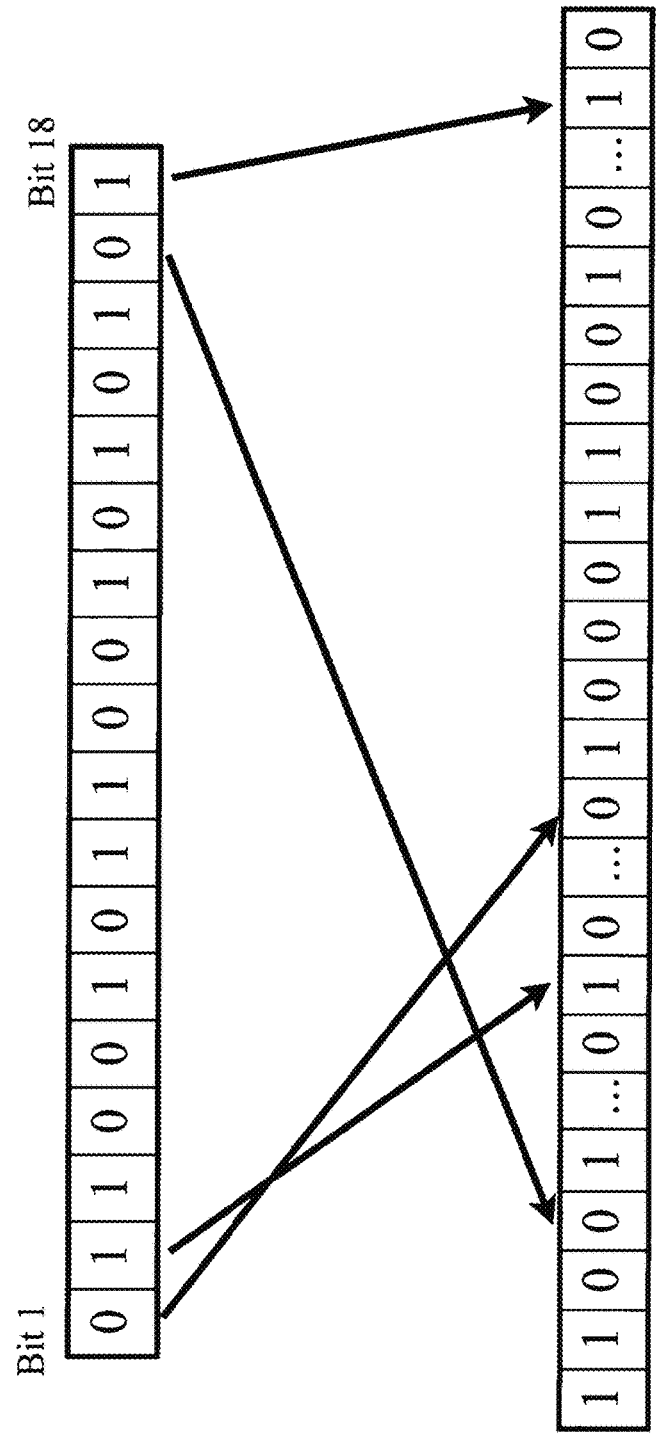

FIG. 12 shows a data transformation that transforms 18 bits of data to a larger sequence of data. The hidden key or hidden noise is represented as S.

Table 1 shows probabilities after Eve observes a hidden key or hidden data inside random noise. The hidden key or hidden noise is represented as $\mathcal{S}$.

7 DETAILED DESCRIPTION

7.1 Information System

In this specification, the term "data" is broad and refers to any kind of information. In some embodiments, data may refer to plaintext information. In some embodiments, data may refer to voice information, transmitted with a landline phone or mobile phone. In some embodiments, data may refer to metadata. In some embodiments, data may refer to email or other information available on the Internet. In some embodiments, data may refer to the information in a sequence of values. In some embodiments, data may refer to the information in a sequence of bit values. In some embodiments, data may refer to the information in a sequence of numbers. In some embodiments, data may refer to the information in a sequence or collection of physical values or physical measurements. In some embodiments, data may refer to the information in a physical location (e.g., GPS coordinates of an auto or a mailing address in Venezia, Italia) or to the information in an abstract location for example, a computer memory address or a virtual address. In some embodiments, data may refer to the information contained in Shakespeare's King Lear or Dostoevsky's Grand Inquisitor or Euclid's Elements. In some embodiments, data may refer to the information in Kepler's astronomical measurements or a collection of geophysical measurements. In some embodiments, data may refer to the information in to a sequence of times or collection of times. In some embodiments, data may refer to the information in statistical data such as economic or insurance information. In some embodiments, data may refer to medical information (e.g., an incurable cancer diagnosis) or genetic information (e.g., that a person has the amino acid substitution causing sickle cell anemia). In some embodiments, data may refer to the information in a photograph of friends or family or satellite photos. In some embodiments, data may refer to the information in a code or sequence of codes. In some embodiments, data may refer to the information in a sequence of language symbols for a language that has not yet been discovered or designed. In some embodiments, data may refer to financial information for example, data may refer to a bid quote on a financial security, or an ask quote on a financial security. In some embodiments, data may refer to information about a machine or a collection of machines for example, an electrial grid or a power plant. In some embodiments, data may refer to what electrical engineers sometimes call signal in information theory. In some embodiments, data may refer to a cryptographic key. In some embodiments, data may refer to a sequence or collection of computer program instructions (e.g., native machine instructions or source code information). In some embodiments, data may refer to a prime number or a mathematical formula or a mathematical invariant information. In some embodiments, data may refer to an internet protocol address or internet traffic information. In some embodiments, data may refer to a combination or amalgamation or synthesis of one or more of these types of aforementioned information.

In this specification, the term "noise" is information that is distinct from data and has a different purpose. Noise is information that helps hide the data so that the noise hinders the adversary Eve from finding or obtaining the data. This hiding of the data helps maintain the privacy of the data. In some embodiments, hiding the data means rearranging or permuting the data inside the noise. An example of data is a key. Hiding a key inside noise helps protect the privacy of the key; the key may subsequently help execute a cryptographic algorithm by a first party (e.g., Alice) or a second party (e.g., Bob).

In this specification, the term "location" may refer to geographic locations and/or storage locations. A particular storage location may be a collection of contiguous and/or noncontiguous locations on one or more machine readable media. Two different storage locations may refer to two different sets of locations on one or more machine-readable media in which the locations of one set may be intermingled with the locations of the other set.

In this specification, the term "machine-readable medium" refers to any non-transitory medium capable of carrying or conveying information that is readable by a machine. One example of a machine-readable medium is a computer-readable medium. Another example of a machine-readable medium is paper having holes that are detected that trigger different mechanical, electrical, and/or logic responses. The term machine-readable medium also includes media that carry information while the information is in transit from one location to another, such as copper wire and/or optical fiber and/or the atmosphere and/or outer space.

In this specification, the term "process" refers to a series of one or more operations. In an embodiment, "process" may also include operations or effects that are best described as non-deterministic. In an embodiment, "process" may include some operations that can be executed by a digital computer program and some physical effects that are non-deterministic, which cannot be executed by a digital computer program and cannot be performed by a finite sequence of processor instructions.

In this specification, the machine-implemented processes implement algorithms and non-deterministic processes on a machine. The formal notion of "algorithm" was introduced in Turing's work [8] and refers to a finite machine that executes a finite number of instructions with finite memory. In other words, an algorithm can be executed with a finite number of machine instructions on a processor. "Algorithm" is a deterministic process in the following sense: if the finite machine is completely known and the input to the machine is known, then the future behavior of the machine can be determined. However, there is quantum random number generator (QRNG) hardware [9, 10] and other embodiments that measure quantum effects from photons (or other physically non-deterministic processes), whose physical process is non-deterministic. The recognition of non-determinism produced by quantum randomness and other quantum embodiments is based on many years of experimental evidence and statistical testing. Furthermore, the quantum theory—derived from the Kochen-Specker theorem and its extensions [11, 12] predicts that the outcome of a quantum measurement cannot be known in advance and cannot be generated by a Turing machine (digital computer program). As a consequence, a physically non-deterministic process cannot be generated by an algorithm: namely, a sequence of operations executed by a digital computer program. FIG. 9A shows an embodiment of a non-deterministic process arising from quantum events; that is, the emission and absorption of photons.

Some examples of physically non-deterministic processes are as follows. In some embodiments that utilize non-determinism, photons strike a semitransparent mirror and can take two or more paths in space. In one embodiment, if the photon is reflected by the semitransparent mirror, then it takes on one bit value b ∈ {0, 1}; if the photon passes through by the semitransparent mirror, then the non-deterministic process produces another bit value 1−b. In another embodiment, the spin of an electron may be sampled to generate the next non-deterministic bit. In still another embodiment, a protein, composed of amino acids, spanning a cell membrane or artificial membrane, that has two or more conformations can be used to detect non-determinism: the protein conformation sampled may be used to generate a non-deterministic value in {0, . . . n−1} where the protein has n distinct conformations. In an alternative embodiment, one or more rhodopsin proteins could be used to detect the arrival times of photons and the differences of arrival times could generate non-deterministic bits. In some embodiments, a Geiger counter may be used to sample non-determinism.

In this specification, the term "photodetector" refers to any type of device or physical object that detects or absorbs photons. A photodiode is an embodiment of a photodetector. A phototransistor is an embodiment of a photodetector. A rhodopsin protein is an embodiment of a photodetector.

In this specification, the term "key" is a type of information and is a value or collection of values to which one or more operations are performed. In some embodiments, one or more of these operations are cryptographic operations. $\{0, 1\}^n$ is the set of all bit-strings of length n. When a key is represented with bits, mathematically a n-bit key is an element of the collection $\{0, 1\}^n$ which is the collection of strings of 0's and 1's of length n. For example, the string of 0's and 1's that starts after this colon is a 128-bit key: 01100001 11000110 01010011 01110001 11000101 10001110 11011001 11010101 01011001 01100100 10110010 10101010 01101101 10000111 10101011 00010111. In an embodiment, n=3000 so that a key is a string of 3000 bits.

In other embodiments, a key may be a sequence of values that are not represented as bits. Consider the set {A, B, C, D, E}. For example, the string that starts after this colon is a 40-symbol key selected from the set {A, B, C, D, E}: ACDEB AADBC EAE BB AAECB ADDCB BDCCE ACECB EACAE. In an embodiment, a key could be a string of length n selected from $\{A, B, C, D, E\}^n$. In an embodiment, n=700 so that the key is a string of 700 symbols where each symbol is selected from {A, B, C, D, E}.

In some embodiments, a key is a collection of one or more values, that specifies how a particular encryption function will encrypt a message. For example, a key may be a sequence of 0's and 1's that are bitwise exclusive-or'ed with the bits that comprise a message to form the encrypted message.

Figure 1A:
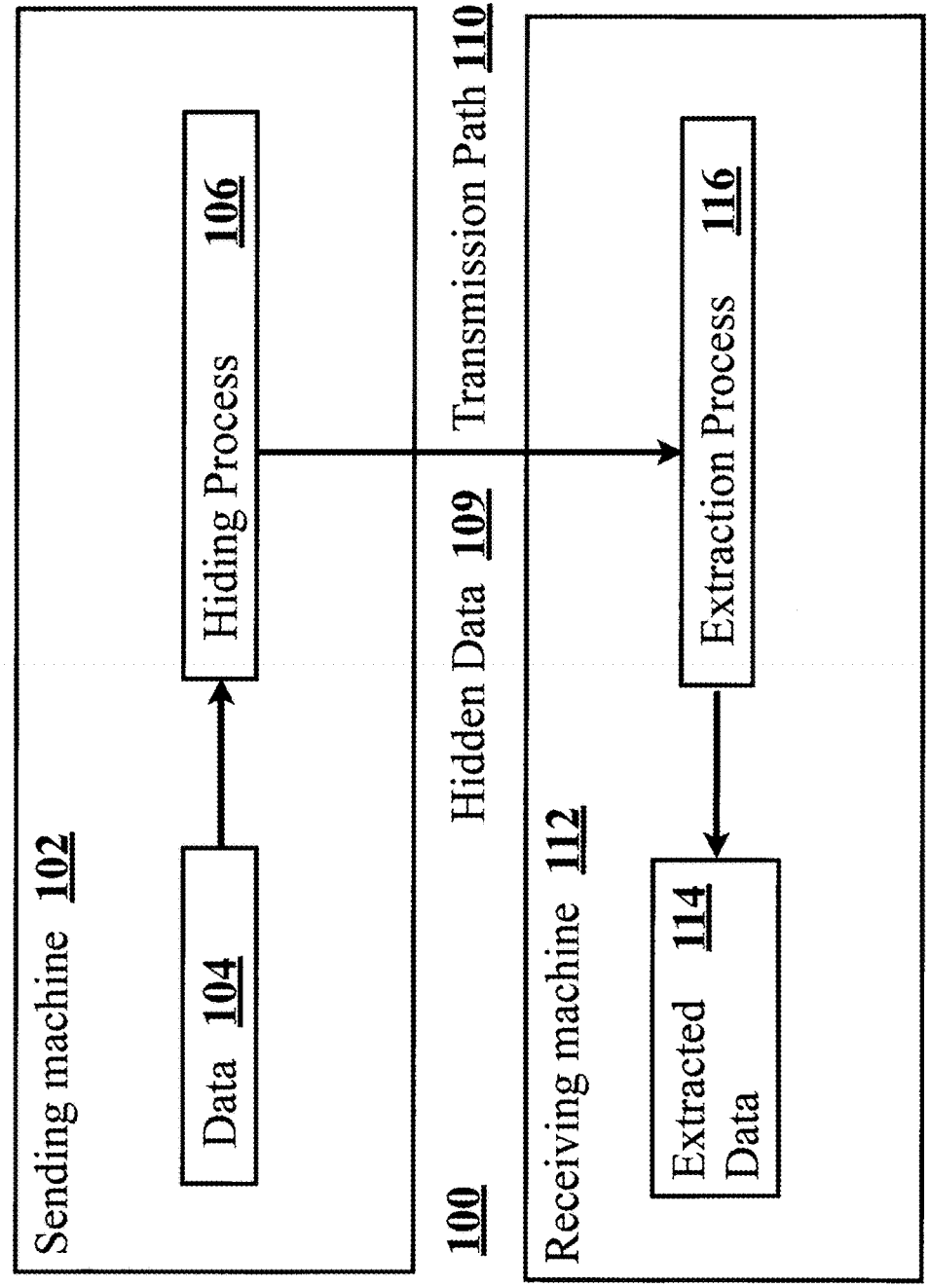
FIG. 1A shows an embodiment of an information system for sending and receiving hidden information or data.

In some embodiments, hidden data (key) 109 in FIG. 1A may be read as input by processor system 258, that executes instructions which perform a cryptographic algorithm. In some embodiments, hidden data (key) 132 in FIG. 1B, may be read as input by processor system 258, that executes instructions which perform a cryptographic algorithm. Symmetric cryptography typically is implemented with a block cipher or a stream cipher. In another embodiment, a key K may be a sequence of values that a stream cipher reads as input so that Alice can encrypt a message M as $\mathcal{E}(K,M)$ with this key and Bob can decrypt $\mathcal{E}(K,M)$ message. In the expression $\mathcal{E}(K,M)$, K represents the key, M represents the message and $\mathcal{E}$ represents the encryption method.

In another embodiment, a key may be a sequence of values that a block cipher reads as input in order to encrypt a message with the block cipher encryption algorithm $\mathcal{E}$. In another embodiment, a key may be a sequence of values that a block cipher reads as input in order to decrypt an encrypted message with the block cipher's decryption algorithm $\mathcal{D}$. If Eve does not know that key, then it is difficult for Eve to decrypt the encrypted message $\mathcal{E}(K,M)$. AES [13] is a common block cipher algorithm that reads 256-bit keys as input. Serpent [14] is also a block cipher algorithm that reads 256-bit keys as input.

In other embodiments, the key be a public key. In some embodiments, a key may refer to a public key for the RSA public-key algorithm [15]. In this case, a key is a huge prime number. In some embodiments, random generator 128 generates a key that is subsequently hidden by scatter map instructions 130.

FIG. 1A shows an information system 100 for hiding information in a manner that is expected to be secure. In this specification, data will sometimes refer to information that has not yet been hidden or encrypted. Information system 100 includes data 104 (not hidden information), and hiding process 106, a sending machine 102, hidden data (hidden information) 109 and a transmission path 110, a receiving machine 112, extraction process 116, extracted data 114. In other embodiments, information system 100 may not have all of the components listed above or may have other components instead of and/or in addition to those listed above.

Information system 100 may be a system for transmitting hidden data. Data 104 refers to information that has a purpose and that has not been hidden yet. In some embodiments, data is intended to be delivered to another location, software unit, machine, person, or other entity.

Figure 4:
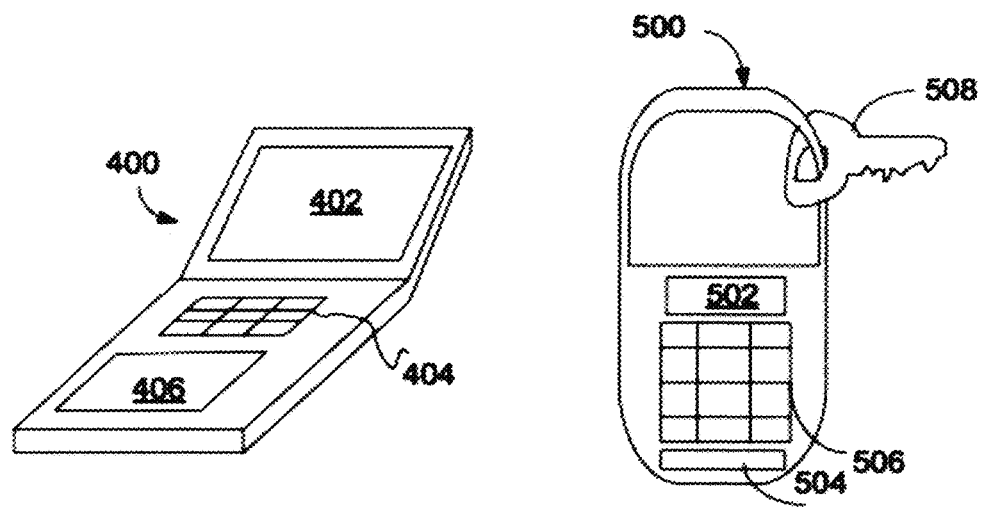
FIG. 4 shows a mobile phone embodiment 400 that hides wireless voice metadata and extracts wireless voice data that was hidden, which may include the sending and/or receiving machines of FIG. 1A. The mobile phone 500 is an embodiment that sends wireless hidden metadata, hidden encrypted data, or hidden keys to an automobile, which may include the sending and/or receiving machines of FIG. 1A.

In some embodiments, data 104 is voice metadata that has not yet been hidden. Voice metadata may contain the IP address of the sending (calling) phone and also the IP address of the receiving phone. Voice metadata may contain the time of the call and the date. Some embodiments of a mobile phone are shown in FIG. 4. In other embodiments, data 104 is email metadata or text metadata or browser metadata.

In an embodiment, data may be unhidden information being transmitted wirelessly between satellites. Data may be represented in analog form in some embodiments and may be represented in digital form. In an embodiment, the sound waves transmitted from a speaker's mouth into a mobile phone microphone are data. The representation of this data information before reaching the microphone is in analog form. Subsequently, the data information may be digitally sampled so it is represented digitally after being received by the mobile phone microphone. In general, data herein refers to any kind of information that has not been hidden or encrypted and that has a purpose.

In information system 100, noise helps hide the data. It may be desirable to keep the contents of data 104 private or secret. Consequently, it may be desirable to hide data 104, so that the transmitted information is expected to be unintelligible to an unintended recipient should the unintended recipient attempt to read and/or extract the hidden data transmitted. Data 104 may be a collection of multiple, not yet hidden information blocks, an entire message of data, a segment of data (information), or any other portion of a data.

Hiding process 106 may be a series of steps that are performed on data 104. In one embodiment, the term "process" refers to one or more instructions for sending machine 102 to execute the series of operations that may be stored on a machine-readable medium. Alternatively, the process may be carried out by and therefore refer to hardware (e.g., logic circuits) or may be a combination of instructions stored on a machine-readable medium and hardware that cause the operations to be executed by sending machine 102 or receiving machine 112. Data 104 may be input for hiding process 106. The steps that are included in hiding process 106 may include one or more mathematical operations and/or one or more other operations.

As a post-processing step, one-way hash function 948 may be applied to a sequence of random events such as quantum events (non-deterministic) generated by non-deterministic generator 942 in FIG. 9A. As a post-processing step, one-way hash function 948 may be applied to a sequence of random events such as quantum events (non-deterministic) generated by non-deterministic generator 952 in FIG. 9B.

Figure 1B:
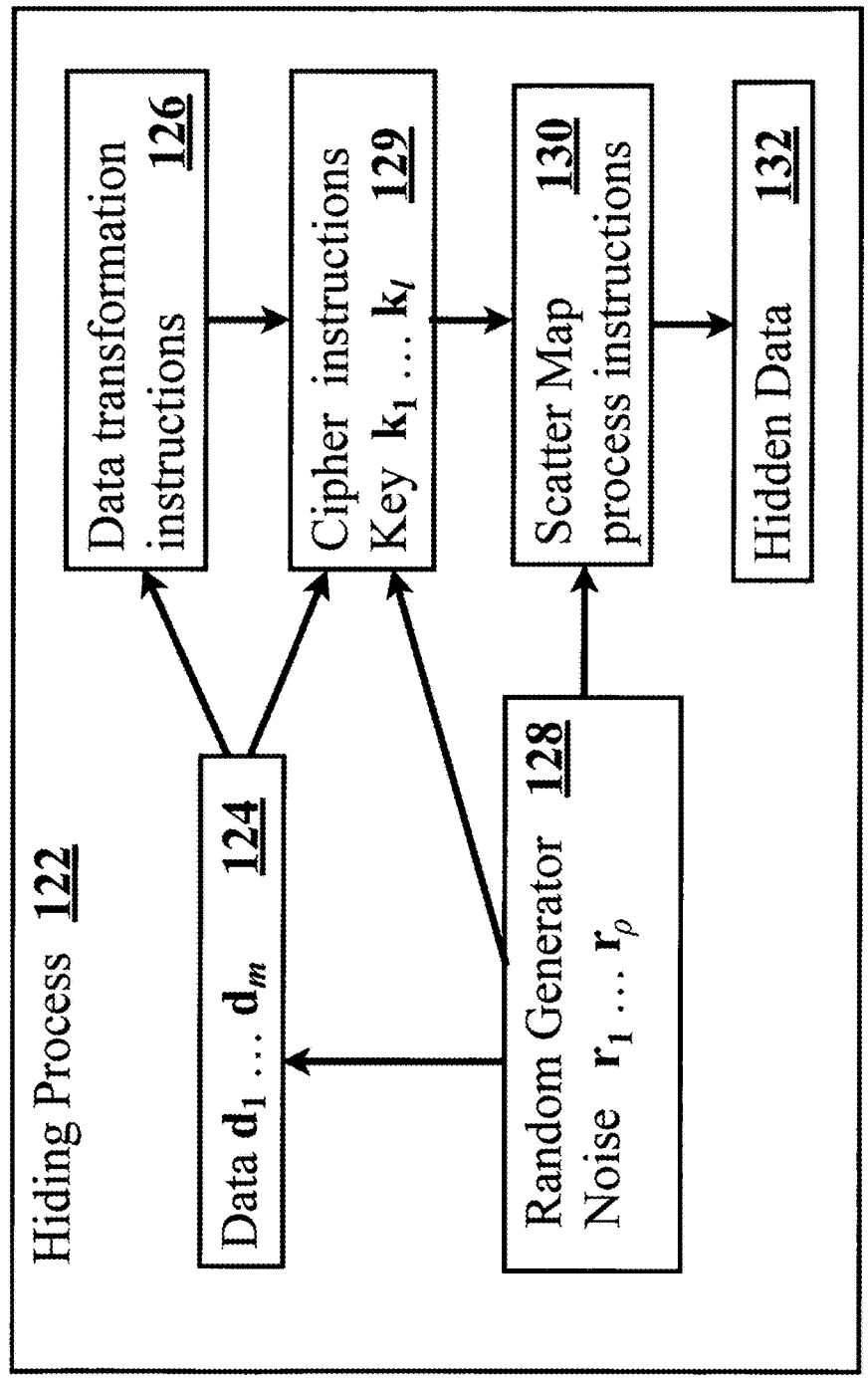
FIG. 1B shows an embodiment of a process for hiding information that can be used in the embodiment of FIG. 1A.

In FIG. 1B hiding process 122 may implement hiding process 106 in FIG. 1A. In some embodiments, cipher instructions 129 may first encrypt the data 124 and subsequently scatter map instructions 130 hide the encrypted data to produce hidden encrypted data 132 before sending machine 102 transmits the hidden data via transmission path 110. In some embodiments, data transformation instructions 126 may transform data 124 before scatter map process instructions 130 are applied to this transformed data. In some embodiments, scatter map process instructions 130 are at least part of the hiding process. In some embodiments, data 124 is transformed by data transformation instructions 126 and encrypted by cipher instructions 129 before scatter map process instructions 130 are applied to this transformed and encrypted data.

In some embodiments, as shown in FIG. 1B, random generator 128 is used to help generate the scatter map that helps perform scatter map process instructions 130. In some embodiments, random generator 128 generates noise that is used by scatter map process instructions 130 to hide data 124 that has previously been transformed by data transformation instructions 126 and/or encrypted by cipher instructions 129. In some embodiments, random generator 128 generates one or more keys as input to cipher instructions 129 that are applied to data 124. In some embodiments, random generator 128 generates one or more keys that are hidden in random noise, generated by random generator 128.

In some embodiments, hiding process 106 requests random generator 128 to help generate one or more keys (shown in cipher instructions 129) for encrypting at least part of data 104. In an embodiment, non-deterministic generator 942 (FIG. 9A) may be part of random generator 128. In an embodiment, non-deterministic generator 952 (FIG. 9B) may be part of random generator 128.

Sending machine 102 may be an information machine that handles information at or is associated with a first location, software unit, machine, person, sender, or other entity. Sending machine 102 may be a computer, a phone, a mobile phone, a telegraph, a satellite, or another type of electronic device, a mechanical device, or other kind of machine that sends information. Sending machine 102 may include one or more processors and/or may include specialized circuitry for handling information. Sending machine 102 may receive data 104 from another source (e.g., a transducer such as a microphone which is inside mobile phone 402 or 502 of FIG. 4), may produce all or part of data 104, may implement hiding process 106, and/or may transmit the output to another entity. In another embodiment, sending machine 102 receives data 104 from another source, while hiding process 106 and the delivery of the output of hiding process 106 are implemented manually. In another embodiment, sending machine 102 implements hiding process 106, having data 104 entered, via a keyboard (for example) or via a mobile phone microphone, into sending machine 102. In another embodiments, sending machine 102 receives output from hiding process 106 and sends the output to another entity.

Sending machine 102 may implement any of the hiding processes described in this specification. Hiding process 106 may include any of the hiding processes described in this specification. For example, hiding process 106 may implement any of the embodiments of the hiding processes 1 or 2, as described in section 7.6; hiding process 106 may implement any of the embodiments of the hiding process 3, as described in section 7.10; hiding process 106 may implement any of the embodiments of the hiding processes 4 or 5, as described in section 7.11; hiding process 106 may implement any of the embodiments of the hiding processes 6 or 7, as described in section 7.13. In some embodiments, hidden data 132, shown in FIG. 1B, includes at least some data 124 that was hidden by the scatter map process instructions 130 that is a part of hiding process 122.

Figure 2A:
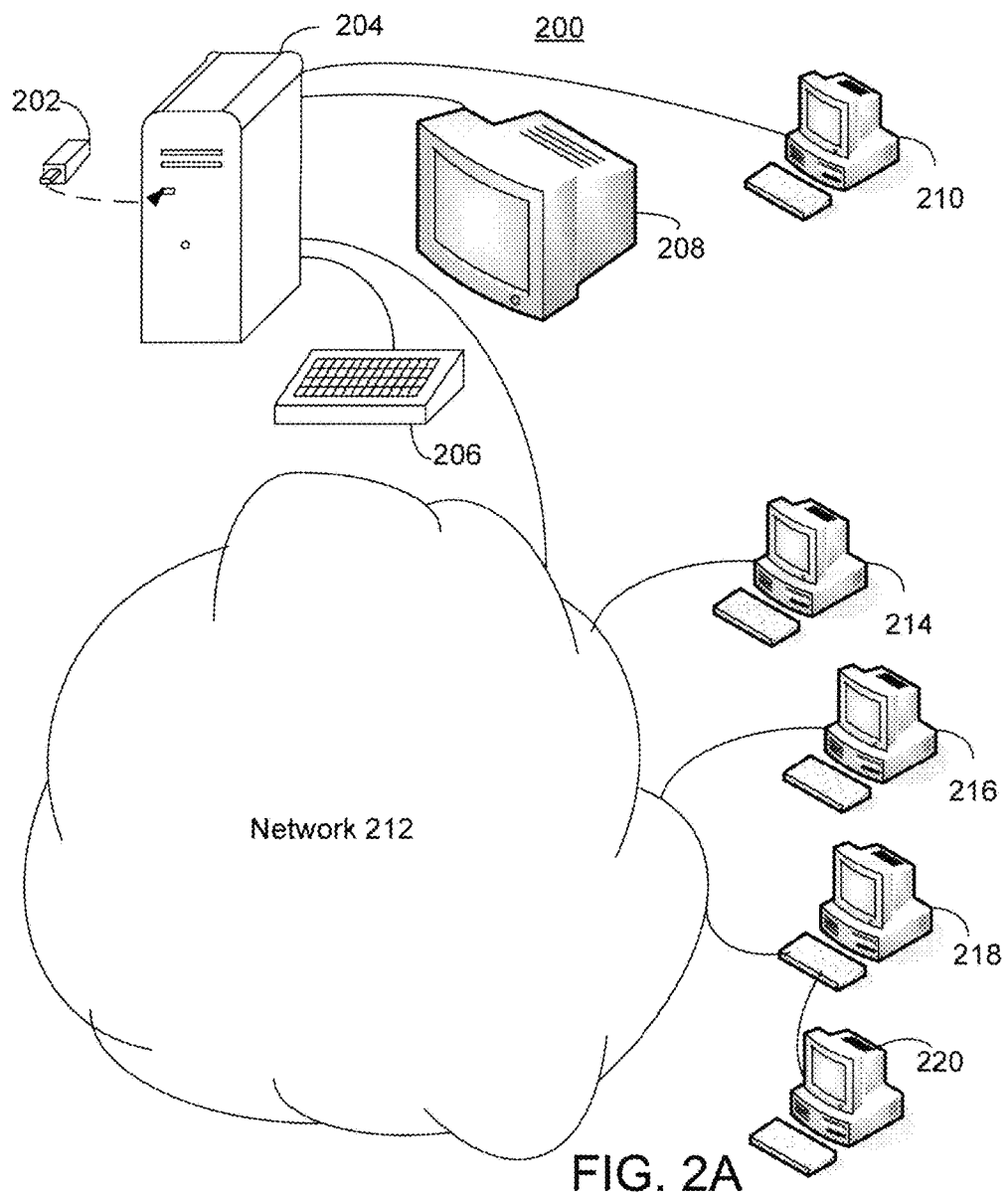
FIG. 2A shows an embodiment of a computer network transmitting hidden data or keys, hidden encrypted data or hidden metadata. In some embodiments, the transmission may be over the Internet or a part of a network that supports an infrastructure such as the electrical grid, a financial exchange, or a power plant, which can be used with the embodiment of FIG. 1A.

Transmission path 110 is the path taken by hidden data 109 to reach the destination to which hidden data 109 was sent. Transmission path 110 may include one or more networks, as shown in FIG. 2A. In FIG. 2A, network 212 may help support transmission path 110. For example, transmission path 110 may be the Internet, which is implemented by network 212; for example, transmission path 110 may be wireless using voice over Internet protocol, which is implemented by network 212. Transmission path 110 may include any combination of any of a direct connection, hand delivery, vocal delivery, one or more Local Area Networks (LANs), one or more Wide Area Networks (WANs), one or more phone networks, including paths under the ground via fiber optics cables and/or one or more wireless networks, and/or wireless inside and/or outside the earth's atmosphere.

Receiving machine 112 may be an information machine that handles information at the destination of an hidden data 109. Receiving machine 112 may be a computer, a phone, a telegraph, a router, a satellite, or another type of electronic device, a mechanical device, or other kind of machine that receives information. Receiving machine 112 may include one or more processors and/or specialized circuitry configured for handling information, such as hidden data 109. Receiving machine 112 may receive hidden data 109 from another source and/or reconstitute (e.g., extract) all or part of hidden data 109. Receiving machine 112 may implement any of the hiding processes described in this specification and is capable of extracting any message hidden by sending machine 102 and hiding process 106.

In one embodiment, receiving machine 112 only receives hidden data 109 from transmission path 110, while hiding process 106 is implemented manually and/or by another information machine. In another embodiment, receiving machine 112 implements extraction process 116 that reproduces all or part of data 104, referred to as extracted data 114 in FIG. 1A. In another embodiment, receiving machine 112 receives hidden data 109 from transmission path 110, and reconstitutes all or part of extracted data 114 using extraction process 116. Extraction process 116 may store any of the processes of hiding information described in this specification. Extraction process 116 may include any of the hiding processes described in this specification Receiving machine 112 may be identical to sending machine 102. For example, receiving machine 112 may receive data 104 from another source, produce all or part of data 104, and/or implement hiding process 106. Similar to sending machine 102, receiving machine 112 may create keys and random noise and random data. Receiving machine 112 may transmit the output of extraction process 116, via transmission path 110 to another entity and/or receive hidden data 109 (via transmission path 110) from another entity. Receiving machine 112 may present hidden data 109 for use as input to extraction process 116.

7.2 Processor, Memory and Input/Output Hardware

Figure 3A:
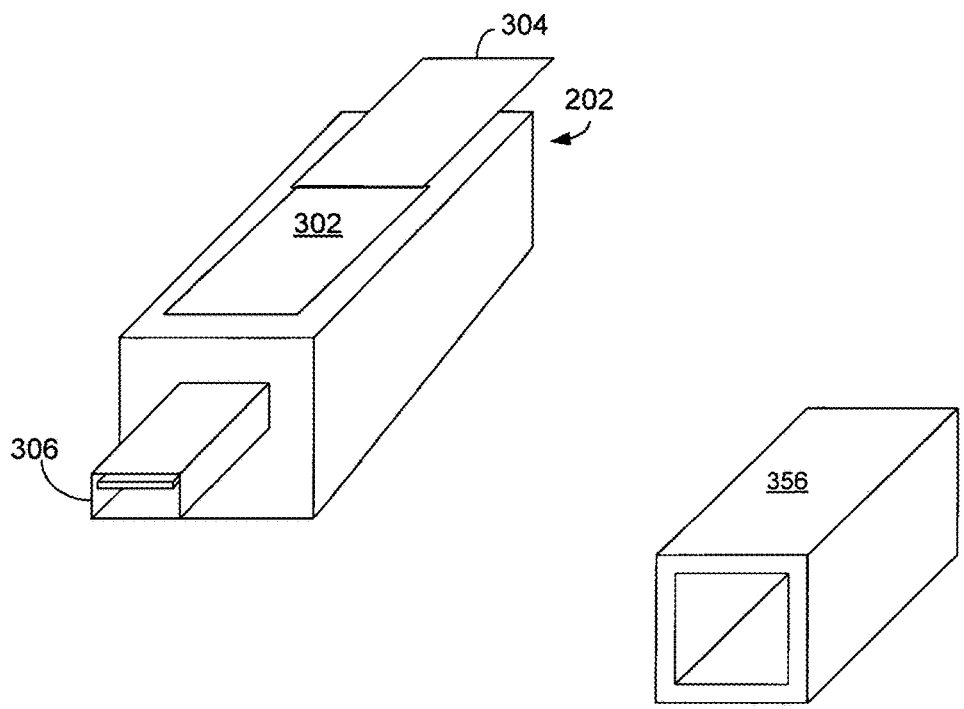
FIG. 3A shows an embodiment of a USB drive that can act as a sending machine and receiving machine to store and protect a user's data.
Figure 3B:
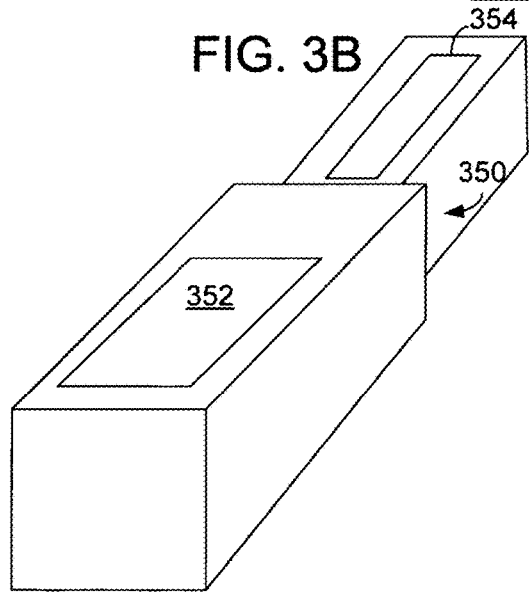
FIG. 3B shows an embodiment of an authentication token, which may include the sending and/or receiving machines of FIG. 1A, that contains a computer processor that can hide data or hide keys.

Information system 200 illustrates some of the variations of the manners of implementing information system 100. Sending machine 202 is one embodiment of sending machine 101. Sending machine 202 may be a secure USB memory storage device as shown in 3A. Sending machine 202 may be an authentication token as shown in FIG. 3B. A mobile phone embodiment of sending machine 202 is shown in FIG. 4.

Sending machine 202 or sending machine 400 may communicate wirelessly with computer 204. In an embodiment, computer 204 may be a call station for receiving hidden data 109 from sending machine 400. A user may use input system 254 and output system 252 of sending machine (mobile phone) 400 to transmit hidden voice data or hidden metadata to a receiving machine that is a mobile phone. In an embodiment, input system 254 in FIG. 2B includes a microphone that is integrated with sending machine (mobile phone) 400. In an embodiment, output system 252 in FIG. 2B includes a speaker that is integrated with sending machine (mobile phone) 400. In another embodiment, sending machine 202 is capable of being plugged into and communicating with computer 204 or with other systems via computer 204.

Computer 204 is connected to system 210, and is connected, via network 212, to system 214, system 216, and system 218, which is connected to system 220. Network 212 may be any one or any combination of one or more Local Area Networks (LANs), Wide Area Networks (WANs), wireless networks, telephones networks, and/or other networks. System 218 may be directly connected to system 220 or connected via a LAN to system 220. Network 212 and system 214, 216, 218, and 220 may represent Internet servers or nodes that route hidden data (e.g., hidden voice data or hidden metadata) received from sending machine 400 shown in FIG. 4. In FIG. 2A, system 214, 216, 218, and system 220 and network 212 may together serve as a transmission path 110 for hidden data 109. In an embodiment, system 214, 216, 218, and system 220 and network 212 may execute the Internet protocol stack in order to serve as transmission path 110 for hidden data 109. In an embodiment, hidden data 109 may be voice data. In an embodiment, hidden data 109 may be routing data. In an embodiment, hidden data 109 may be TCP/IP data. In an embodiment, hidden data 109 may be metadata. In an embodiment, hidden data 109 may be email. In an embodiment, hidden data 109 may be text data sent from sending machine 400.

In FIG. 1B, hiding process 122 may be implemented by any of, a part of any of, or any combination of any of system 210, network 212, system 214, system 216, system 218, and/or system 220. As an example, routing information of transmission path 110 may be hidden with hiding process 122 that executes in system computer 210, network computers 212, system computer 214, system computer 216, system computer 218, and/or system computer 220. Hiding process 106 may be executed inside sending machine 400 and extraction process 116 may be executed inside receiving machine 400 in FIG. 4.

Figure 2B:
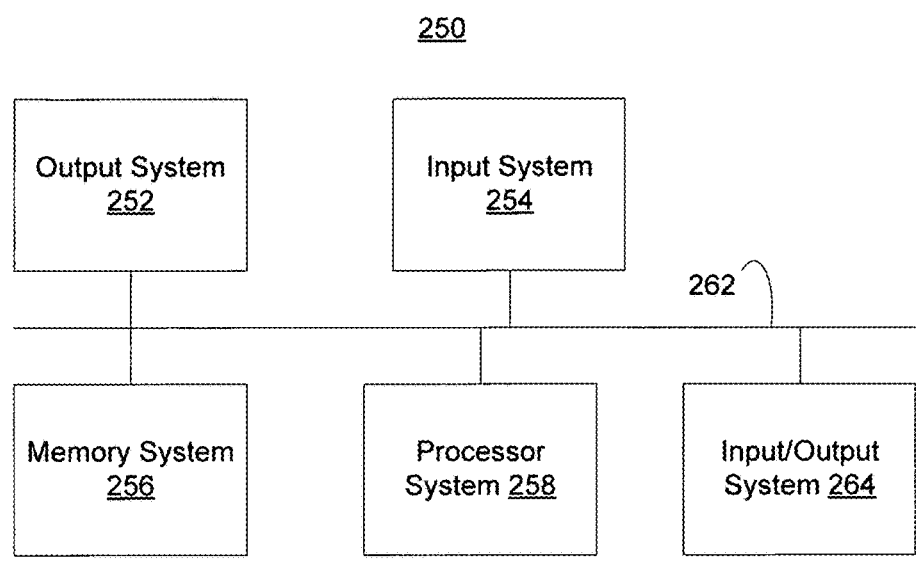
FIG. 2B shows an embodiment of a secure computing area for hiding information, which includes a processor, memory and input/output system, which may be the sending and/or receiving machines of FIG. 1A.

In an embodiment, hiding process 106 and extraction process 116 execute in a secure area of processor system 258 of FIG. 2B. In an embodiment, specialized hardware in processor system 258 may be implemented to speed up the computation of scatter map instructions 130 in FIG. 1B. In an embodiment, this specialized hardware in processor system 258 may be embodied as an ASIC (application specific integrated circuit) that computes SHA-1 and/or SHA-512 and/or Keccak and/or BLAKE and/or JH and/or Skein that help execute one-way hash function 948 in non-deterministic generator 942 or one-way hash function 958 in non-deterministic generator 952 or one-way hash instructions 964 in deterministic generator 962.

In an embodiment, specialized hardware in processor system 258 may be embodied as an ASIC (application specific integrated circuit) that computes SHA-1 and/or SHA-512 and/or Keccak and/or BLAKE and/or JH and/or Skein that help execute the HMAC function in process 4 named Hiding One or More Keys with Authentication or help execute process 5 named Hiding Encrypted Data Elements with Authentication. An ASIC chip can increase the execution speed and protect the privacy of hiding process 106 and extraction process 116.

In an embodiment, input system 254 of FIG. 2B receives voice data and sends the voice data to processor system 258 where the voice data or voice metadata is hidden. Output system 252 sends the hidden voice data 109 to a telecommunication network 212. In an embodiment, memory system 256 stores scatter map instructions 130, data transformation instructions 126, and cipher instructions 129.

In an embodiment, memory system 256 of FIG. 2B stores scatter map instructions 132. In an embodiment, memory system 256 stores hidden data or hidden metadata that is waiting to be sent to output system 252 and sent out along transmission path 110, routed and served by system computers 210, 214, 216, 218 and 220 and network 212.

7.3 Non-Deterministic Generators

FIG. 9A shows an embodiment of a non-deterministic generator 942 arising from quantum events: that is, random noise generator uses the emission and absorption of photons for its non-determinism. In FIG. 9A, phototransistor 944 absorbs photons emitted from light emitting diode 954. In an embodiment, the photons are produced by a light emitting diode 946. In FIG. 9B, non-deterministic generator 952 has a photodiode 954 that absorbs photons emitted from light emitting diode 956. In an embodiment, the photons are produced by a light emitting diode 956.

FIG. 10 shows a light emitting diode (LED) 1002. In an embodiment, LED 1002 emits photons and is part of the non-deterministic generator 942 (FIG. 9A). In an embodiment, LED 1002 emits photons and is part of the non-deterministic generator 952 (FIG. 9B). LED 1002 contains a cathode, a diode, an anode, one terminal pin connected to the cathode and one terminal pin connected to the anode, a p-layer of semiconductor, an active region, an n-layer of semiconductor, a substrate and a transparent plastic case. The plastic case is transparent so that a photodetector outside the LED case can detect the arrival times of photons emitted by the LED. In an embodiment, photodiode 944 absorbs photons emitted by LED 1002. In an embodiment, phototransistor 954 absorbs photons emitted by LED 1002.

The emission times of the photons emitted by the LED experimentally obey the energy-time form of the Heisenberg uncertainty principle. The energy-time form of the Heisenberg uncertainty principle contributes to the non-determinism of random noise generator 142 because the photon emission times are unpredictable due to the uncertainty principle. In FIGS. 9A and 9B, the arrival of photons are indicated by a squiggly curve with an arrow and by next to the curve. The detection of arrival times of photons is a non-deterministic process. Due to the uncertainty of photon emission, the arrival times of photons are quantum events.

In FIGS. 9A and 9B, hv refers to the energy of a photon that arrives at photodiode 944, respectively, where h is Planck's constant and v is the frequency of the photon. In FIG. 9A, the p and n semiconductor layers are a part of a phototransistor 944, which generates and amplifies electrical current, when the light that is absorbed by the phototransistor. In FIG. 9B, the p and n semiconductor layers are a part of a photodiode 954, which absorbs photons that strike the photodiode.

A photodiode is a semiconductor device that converts light (photons) into electrical current, which is called a photocurrent. The photocurrent is generated when photons are absorbed in the photodiode. Photodiodes are similar to standard semiconductor diodes except that they may be either exposed or packaged with a window or optical fiber connection to allow light (photons) to reach the sensitive part of the device. A photodiode may use a PIN junction or a p-n junction to generate electrical current from the absorption of photons. In some embodiments, the photodiode may be a phototransistor.

A phototransistor is a semiconductor device comprised of three electrodes that are part of a bipolar junction transistor. Light or ultraviolet light activates this bipolar junction transistor. Illumination of the base generates carriers which supply the base signal while the base electrode is left floating. The emitter junction constitutes a diode, and transistor action amplifies the incident light inducing a signal current.

When one or more photons with high enough energy strikes the photodiode, it creates an electron-hole pair. This phenomena is a type of photoelectric effect. If the absorption occurs in the junction's depletion region, or one diffusion length away from the depletion region, these carriers (electron-hole pair) are attracted from the PIN or p-n junction by the built-in electric field of the depletion region. The electric field causes holes to move toward the anode, and electrons to move toward the cathode; the movement of the holes and electrons creates a photocurrent. In some embodiments, the amount of photocurrent is an analog value, which can be digitized by a analog-to-digital converter. In some embodiments, the analog value is amplified before being digitized. The digitized value is what becomes the random noise. In some embodiments, a one-way hash function 948 or 958 may also be applied to post-process the random noise to produce the noise $r_1 r_2 \ldots r_p$ used by processes 1, 2, 3 4 and 5. In some embodiments, a one-way hash function may be applied to the random noise to produce key(s) $k_1 k_2 \ldots k_m$, used by processes 2 and 4.

In an embodiment, the sampling of the digitized photocurrent values may converted to threshold times as follows. A photocurrent threshold θ is selected as a sampling parameter. If a digitized photocurrent value $i_1$ is above θ at time $t_1$, then $t_1$ is recorded as a threshold time. If the next digitized photocurrent value $i_2$ above θ occurs at time $t_2$, then $t_2$ is recorded as the next threshold time. If the next digitized value $i_3$ above θ occurs at time $t_3$, then $t_3$ is recorded as the next threshold time.

After three consecutive threshold times are recorded, these three times can determine a bit value as follows. If $t_2-t_1 > t_3-t_2$, then random noise generator produces a 1 bit. If $t_2-t_1 < t_3-t_2$, then random noise generator produces a 0 bit. If $t_2-t_1 = t_3-t_2$, then no noise information is produced. To generate the next bit, random noise generator 942 or 952 continues the same sampling steps as before and three new threshold times are produced and compared.

In an alternative sampling method, a sample mean μ is established for the photocurrent, when it is illuminated with photons. In some embodiments, the sampling method is implemented as follows. Let $i_1$ be the photocurrent value sampled at the first sampling time. $i_1$ is compared to μ. ϵ is selected as a parameter in the sampling method that is much smaller number than μ. If $i_1$ is greater than μ+ϵ, then a 1 bit is produced by the random noise generator 942 or 952. If $i_1$ is less than μ−ϵ, then a 0 bit is produced by random noise generator 942 or 952. If $i_1$ is in the interval [μ−ϵ, μ+ϵ], then NO bit is produced by random noise generator 942 or 952.

Let $i_2$ be the photocurrent value sampled at the next sampling time. $i_2$ is compared to μ. If $i_2$ is greater than μ+ϵ, then a 1 bit is produced by the random noise generator 942 or 952. If $i_2$ is less than μ−ϵ, then a 0 bit is produced by the random noise generator 942 or 952. If $i_2$ is in the interval [μ−ϵ, μ+ϵ], then NO bit is produced by the random noise generator 942 or 952. This alternative sampling method continues in the same way with photocurrent values $i_3$, $i_4$, and so on. In some embodiments, the parameter E is selected as zero instead of a small positive number relative to μ.

Some alternative hardware embodiments of non-deterministic generator 128 (FIG. 1B) are described below. In some embodiments that utilize non-determinism to produce random noise, a semitransparent mirror may be used. In some embodiments, the mirror contains quartz (glass). The photons that hit the mirror may take two or more paths in space. In one embodiment, if the photon is reflected, then the random noise generator creates the bit value b∈{0, 1}; if the photon is transmitted, then the random noise generator creates the other bit value 1−b. In another embodiment, the spin of an electron may be sampled to generate the next non-deterministic bit. In still another embodiment of a random noise generator, a protein, composed of amino acids, spanning a cell membrane or artificial membrane, that has two or more conformations can be used to detect non-determinism: the protein conformation sampled may be used to generate a random noise value in {0, . . . n−1} where the protein has n distinct conformations. In an alternative embodiment, one or more rhodopsin proteins could be used to detect the arrival times $t_1 < t_2 < t_3$ of photons and the differences of arrival times ($t_2-t_1 > t_3-t_2$ versus $t_2-t_1 < t_3-t_2$) could generate non-deterministic bits that produce random noise.

In some embodiments, the seek time of a hard drive can be used as random noise values as the air turbulence in the hard drive affects the seek time in a non-deterministic manner. In some embodiments, local atmospheric noise can be used as a source of random noise. For example, the air pressure, the humidity or the wind direction could be used. In other embodiments, the local sampling of smells based on particular molecules could also be used as a source of random noise.

In some embodiments, a Geiger counter may be used to sample non-determinism and generate random noise. In these embodiments, the unpredictability is due to radioactive decay rather than photon emission, arrivals and detection.

7.4 Deterministic Generators

In an embodiment, a deterministic generator 962 (FIG. 9C) is implemented with a machine. In an embodiment, machine 1 generates noise 972 as follows. Φ is one-way hash function with digest size d and is executed with one-way hash instructions 964. In some embodiments, Ψ is a one-way hash function with digest size at least ρ bits (noise size) and is executed with one-way hash instructions 968. In some embodiments, if ρ is greater than digest size of Ψ, then the generator update steps in machine 1 may be called more than once to generate enough noise.

In some embodiments, Φ and Ψ are the same one-way hash functions. In other embodiments, Φ and Ψ are different one-way hash functions. In an embodiment, Φ is one-way hash function SHA-512 and Ψ is one-way hash function Keccak. In another embodiment, Φ is one-way hash function Keccak and Ψ is one-way hash function SHA-512.

In an embodiment, the ith generator Δ(i) is composed of N bits and updated with generator update instructions 966. The N bits of Δ(i) are represented as $\Delta_{i,0} \Delta_{i,1} \ldots \Delta_{i,N-1}$ where each bit $\Delta_{i,j}$ is a 0 or 1. In an embodiment, generator update instructions 966 are executed according to the following two steps described in machine 1:

---
Update $(\Delta_{i+1,0} \Delta_{i+1,1} \ldots \Delta_{i+1,d-1}) = \Phi(\Delta_{i,0} \Delta_{i,1} \ldots \Delta_{i,d-1})$
Update $\Delta_{i+1,j} = \Delta_{i,j}$ for each j satisfying $d \leq j \leq N - 1$
---

In an embodiment, the size of the deterministic generator N may be 1024. In another embodiment, N may be fifty thousand. In another embodiment, N may be ten billion.

In an embodiment, one-way hash instructions 964 are performed by processor system 258 (FIG. 1B). In an embodiment, one-way hash instructions 968 are performed by processor system 258 (FIG. 1B). In an embodiment, generator update instructions 966 are performed by processor system 258 (FIG. 1B). In an embodiment, memory system 256 stores one-way hash instructions 964, one-way hash instructions 968 and generator update instructions 966.

In an embodiment, the instructions that execute machine 1 and help execute deterministic generator 962 may expressed in the C programming language before compilation. In an embodiment, the instructions that execute machine 1 and help execute deterministic generator 962 may be expressed in the native machine instructions of processor system 258. In an embodiment, the instructions that execute machine 1 may be implemented as an ASIC, which is part of processor system 258.

Machine 1. Generating Noise with a Machine

---
0th generator state $\Delta(0) = \Delta_{0,0} \ldots \Delta_{0,N-1}$.
Initialize i = 0
while( hiding process 122 requests more noise )
{
    Update $(\Delta_{i+1,0} \Delta_{i+1,1} \ldots \Delta_{i+1,d-1}) = \Phi (\Delta_{i,0} \Delta_{i,1} \ldots \Delta_{i,d-1})$
    Update $\Delta_{i+1,j} = \Delta_{i,j}$ for each j satisfying $d \leq j \leq N - 1$
    Increment i
    Generate noise 972 $r_1 r_2 \ldots r_\rho$ by executing one-way hash Ψ
    instructions 968 on
    generator state Δ(i) as input to Ψ, where noise $r_1 r_2 \ldots r_\rho$ is
    the first ρ bits of hash output $\Psi(\Delta_{i,0} \ldots \Delta_{i,N-1})$.
}
---

In an embodiment, machine 2 generates key(s) 970 as follows. Φ is one-way hash function with digest size d and is executed with one-way hash instructions 964. In some embodiment, Ψ is a one-way hash function with digest size at least m bits (size of one or more keys) and is executed with one-way hash instructions 968. In some embodiments, if m is greater than digest size of Ψ, then the generator update steps in machine 2 may be called more than once to generate enough keys.

In some embodiments, Φ and Ψ0 are the same one-way hash functions. In other embodiments, Φ and Ψ are different one-way hash functions. In an embodiment, Φ is one-way hash function SHA-512 and Ψ is one-way hash function Keccak. In another embodiment, Φ is one-way hash function Keccak and Ψ is one-way hash function SHA-512.

In an embodiment, the ith generator Δ(i) is composed of N bits and updated with generator update instructions 966. The N bits of Δ(i) are represented as $\Delta_{i,0} \Delta_{i,1} \ldots \Delta_{i,N-1}$ where each bit $\Delta_{i,j}$ is a 0 or 1. In an embodiment, generator update instructions 966 are executed according to the following two steps described in machine 2:

---
Update $(\Delta_{i+1,0} \Delta_{i+1,1} \ldots \Delta_{i+1,d-1}) = \Phi(\Delta_{i,0} \Delta_{i,1} \ldots \Delta_{i,d-1})$
Update $\Delta_{i+1,j} = \Delta_{i,j}$ for each j satisfying $d \leq j \leq N - 1$
---

In an embodiment, the size of the deterministic generator N may be 1024. In another embodiment, N may be fifty thousand. In another embodiment, N may be ten billion.

In an embodiment, one-way hash instructions 964 are performed by processor system 258 (FIG. 1B). In an embodiment, one-way hash instructions 968 are performed by processor system 258 (FIG. 1B). In an embodiment, generator update instructions 966 are performed by processor system 258 (FIG. 1B). In an embodiment, memory system 256 stores one-way hash instructions 964, one-way hash instructions 968 and generator update instructions 966.

In an embodiment, the instructions that execute machine 2 and help execute deterministic generator 962 may expressed in the C programming language before compilation. In an embodiment, the instructions that execute machine 2 and help execute deterministic generator 962 may be expressed in the native machine instructions of processor system 258. In an embodiment, the instructions that execute machine 2 may be implemented as an ASIC, which is part of processor system 258. In an embodiment, memory system 956 may store one or more keys 970.

Machine 2. Generating One or More Keys with a Machine

---
0th generator state $\Delta(0) = \Delta_{0,0} \ldots \Delta_{0,N-1}$.
Initialize i = 0
while( hiding process 122 requests more key(s) )
{
    Update generator $(\Delta_{i+1,0} \Delta_{i+1,1} \ldots \Delta_{i+1,d-1}) = \Phi(\Delta_{i,0} \Delta_{i,1} \ldots \Delta_{i,d-1})$.
    Update generator $\Delta_{i+1,j} = \Delta_{i,j}$ for each j satisfying $d \leq j \leq N - 1$
    Increment i
    Generate key(s) 970 $k_1 k_2 \ldots k_m$ by executing one-way hash Ψ
    instructions 968 on
    generator state Δ(i) as input to Ψ, where $k_1 k_2 \ldots k_m$ is the first
    m
    bits of hash output $\Psi(\Delta_{i,0} \ldots \Delta_{i,N-1})$.
}
---

7.5 One-Way Hash Functions

In FIG. 9A, one-way hash function 948 may include one or more one-way functions. A one-way hash function Φ, has the property that given an output value z, it is computationally intractable to find an information element $m_z$ such that $\Phi(m_z) = z$. In other words, a one-way function Φ is a function that can be easily computed, but that its inverse $\Phi^{-1}$ is computationally intractable to compute [16]. A computation that takes $10^{101}$ computational steps is considered to have computational intractability of $10^{101}$.

More details are provided on computationally intractable. In an embodiment, there is an amount of time T that encrypted information must stay secret. If encrypted information has no economic value or strategic value after time T, then computationally intractable means that the number of computational steps required by all the world's computing power will take more time to compute than time T. Let C(t) denote all the world's computing power at the time t in years.

Consider an online bank transaction that encrypts the transaction details of that transaction. Then in most embodiments, the number of computational steps that can be computed by all the world's computers for the next 30 years is in many embodiments likely to be computationally intractable as that particular bank account is likely to no longer exist in 30 years or have a very different authentication interface.

To make the numbers more concrete, the 2013 Chinese supercomputer that broke the world's computational speed record computes about 33,000 trillion calculations per second [17]. If T=1 one year and we can assume that there are at most 1 billion of these supercomputers. (This can be inferred from economic considerations, based on a far too low 1 million dollar price for each supercomputer. Then these 1 billion supercomputers would cost 1,000 trillion dollars.). Thus, C(2014)×1 year is less than $10^9 \times 33 \times 10^{15} \times 3600 \times 24 \times 365 = 1.04 \times 10^{33}$ computational steps.

As just discussed, in some embodiments and applications, computationally intractable may be measured in terms of how much the encrypted information is worth in economic value and what is the current cost of the computing power needed to decrypt that encrypted information. In other embodiments, economic computational intractability may be useless. For example, suppose a family wishes to keep their child's whereabouts unknown to violent kidnappers. Suppose T=100 years because it is about twice their expected lifetimes. Then 100 years×C(2064) is a better measure of computationally intractible for this application. In other words, for critical applications that are beyond an economic value, one should strive for a good estimate of the world's computing power.

One-way functions that exhibit completeness and a good avalanche effect or the strict avalanche criterion [18] are preferable embodiments: these properties are favorable for one-way hash functions. The definition of completeness and a good avalanche effect are quoted directly from [18]:

If a cryptographic transformation is complete, then each ciphertext bit must depend on all of the plaintext bits. Thus, if it were possible to find the simplest Boolean expression for each ciphertext bit in terms of plaintext bits, each of those expressions would have to contain all of the plaintext bits if the function was complete. Alternatively, if there is at least one pair of n-bit plaintext vectors X and $X_i$ that differ only in bit i, and $f(X)$ and $f(X_i)$ differ at least in bit j for all $\{(i,j):1 \le i, j \le n\}$, the function $f$ must be complete.

For a given transformation to exhibit the avalanche effect, an average of one half of the output bits should change whenever a single input bit is complemented. In order to determine whether a m×n (m, input bits and n output bits) function $f$ satisfies this requirement, the $2^m$ plaintext vectors must be divided into $2^{m-1}$ pairs, X and $X_j$ such that X and $X_j$ differ only in bit i. Then the $2^{m-1}$ exclusive-or sums $V_i = f(X) \oplus f(X_i)$ must be calculated. These exclusive-or sums will be referred to as avalanche vectors, each of which contains n bits, or avalanche variables.

If this procedure is repeated for all i such that $1 \le i \le m$ and one half of the avalanche variables are equal to 1 for each i, then the function $f$ has a good avalanche effect. Of course this method can be pursued only if m is fairly small; otherwise, the number of plaintext vectors becomes too large. If that is the case then the best that can be done is to take a random sample of plaintext vectors X, and for each value i calculate all avalanche vectors $V_i$. If approximately one half the resulting avalanche variables are equal to 1 for values of i, then we can conclude that the function has a good avalanche effect.

A hash function, also denoted as $\Phi$, is a function that accepts as its input argument an arbitrarily long string of bits (or bytes) and produces a fixed-size output of information. The information in the output is typically called a message digest or digital fingerprint. In other words, a hash function maps a variable length m of input information to a fixed-sized output, $\Phi(m)$, which is the message digest or information digest. Typical output sizes range from 160 to 512 bits, but can also be larger. An ideal hash function is a function $\Phi$, whose output is uniformly distributed in the following way: Suppose the output size of $\Phi$ is n bits. If the message m is chosen randomly, then for each of the $2^n$ possible outputs z, the probability that $\Phi(m)=z$ is $2^{-n}$. In an embodiment, the hash functions that are used are one-way.

A good one-way hash function is also collision resistant. A collision occurs when two distinct information elements are mapped by the one-way hash function $\Phi$ to the same digest. Collision resistant means it is computationally intractable for an adversary to find colllisions: more precisely, it is computationally intractable to find two distinct information elements $m_1$, $m_2$ where $m_1 \ne m_2$ and such that $\Phi(m_1) = \Phi(m_2)$.

A number of one-way hash functions may be used to implement one-way hash function 148. In an embodiment, SHA-512 can implement one-way hash function 148, designed by the NSA and standardized by NIST [19]. The message digest size of SHA-512 is 512 bits. Other alternative hash functions are of the type that conform with the standard SHA-384, which produces a message digest size of 384 bits. SHA-1 has a message digest size of 160 bits. An embodiment of a one-way hash function 148 is Keccak [20]. An embodiment of a one-way hash function 148 is BLAKE [21]. An embodiment of a one-way hash function 148 is Grøstl [22]. An embodiment of a one-way hash function 148 is JH [23]. Another embodiment of a one-way hash function is Skein [24].

7.6 Scatter Map Hiding

A scatter map is a function that permutes data (information) to a sequence of distinct locations inside the random noise. To formally define a scatter map, the location space is defined first.

Definition 1

Let $m, n \in \mathbb{N}$, where $m \le n$. The set $\mathcal{L}_{m,n} = \{(l_1, l_2 \ldots l_m) \in \{1, 2, \ldots n\}^m : l_j \ne l_k \text{ whenever } j \ne k\}$ is called an (m,n) location space.

Remark 1.

The location space $\mathcal{L}_{m,n}$ has $$\frac{n!}{(n-m)!}$$

elements.

Definition 2

Given a location element $(l_1, l_2 \ldots l_m) \in \mathcal{L}_{m,n}$, the noise locations with respect to $(l_1, l_2 \ldots l_m)$ are denoted as $\mathcal{N}(l_1, l_2 \ldots l_m) = \{1, 2, \ldots n\} - \{l_i : 1 \le i \le m\}$.

Definition 3

An (m,n) scatter map is an element $\pi = (l_1, l_2 \ldots l_m) \in L_{m,n}$ such that $\pi: \{0,1\}^m \times \{0,1\}^{n-m} \to \{0,1\}^n$ and $\pi(d_1, \ldots, d_m, r_1, r_2 \ldots r_{n-m}) = (s_1, \ldots, s_n)$ where the hiding locations $s_i$ are selected as follows. Set $s_{l_1} = d_1$ $s_{l_2} = d_2 \ldots s_{l_m} = d_m$. For the noise locations, set $s_{i_1} = r_1$ for the smallest subscript $i_1 \in \mathcal{N}(\pi)$. Set $s_{i_k} = r_k$ for the kth smallest subscript $i_k \in \mathcal{N}(\pi)$.

Definition 3 describes how the scatter map selects the hiding locations of the parts of the key or data hidden in the noise. Furthermore, the scatter map process stores the noise in the remaining locations that do not contain parts of the key or data. Before the scatter map process begins, it is assumed that an element $\pi \in \mathcal{L}_{m,n}$ is randomly selected with a uniform distribution and Alice and Bob already have secret scatter map $\pi = (l_1, l_2, \ldots l_m)$.

Hiding Process 1. Scatter Map Process Hides Data

Alice retrieves data $d_1 d_2 \ldots d_m$.

Alice generates noise $r_1 r_2 \ldots r_\rho$ with her random noise generator.

Per definition 3, Alice uses scatter map $\pi$ to store her data $s_{l_1} = d_1 \ldots s_{l_m} = d_m$.

Per definition 3, Alice stores the noise in the noise (unoccupied) locations of $\mathcal{S}(s_1 \ldots s_n)$ so that the data $d_1 d_2 \ldots d_m$ is hidden in the noise.

Alice sends $\mathcal{S}$ to Bob.

Bob receives $\mathcal{S}$.

Bob uses scatter map $\pi$ to extract data $d_1 \ldots d_m$ from $\mathcal{S}$.

In an embodiment of process 1, scatter map $\pi$ is executed by scatter map instructions 130 (FIG. 1B) and these instructions follow definition 3. In FIG. 2B, processor system 258 executes scatter map process instructions 130 during the step Alice uses scatter map $\pi$ to store her data $s_{l_1} = d_1 \ldots s_{l_m} = d_m$. In an embodiment, scatter map process instructions 130 are stored in memory system 256 (FIG. 2B). In FIG. 2B, processor system 258 executes scatter map process instructions 130 during the step Alice stores the noise in the noise (unoccupied) locations of $\mathcal{S} = (s_1 \ldots s_n)$ so that the data $d_1 d_2 \ldots d_m$ is hidden in the noise.

In an embodiment of process 1, output system 252 in FIG. 2B is used during the step Alice sends $\mathcal{S}$ to Bob. Output system 252 is part of sending machine 102 in FIG. 1A. In an embodiment of process 1, input system 254 in FIG. 2B is used during the step Bob receives $\mathcal{S}$. Input system 254 is a part of receiving machine 112 in FIG. 1A.

Hiding Process 2. Scatter Map Process Hides One or More Keys

Alice generates one or more keys $k_1 k_2 \ldots k_m$ with her random noise generator and random noise $r_1 r_2 \ldots r_\rho$.

Per definition 3, Alice stores one or more keys $s_{l_1} = k_1 \ldots s_{l_m} = k_m$ using scatter map $\pi$.

Per definition 3, Alice stores the noise $r_1 r_2 \ldots r_\rho$ in the noise (unoccupied) locations of $\mathcal{S} = (s_1 \ldots s_n)$ so that the one or more keys $k_1 k_2 \ldots k_m$ are hidden in the noise.

Alice sends $\mathcal{S}$ to Bob.

Bob receives $\mathcal{S}$.

Bob uses scatter map $\pi$ to extract one or more keys $k_1 \ldots k_m$ from $\mathcal{S}$.

In an embodiment of process 2, scatter map $\pi$ is executed by scatter map instructions 130 (FIG. 1B) and these instructions follow definition 3. In FIG. 2B, processor system 258 executes scatter map process instructions 130 during the step Alice stores one or more keys $s_{l_1} = k_1 \ldots s_{l_m} = k_m$ using scatter map $\pi$. In an embodiment, scatter map process instructions 130 are stored in memory system 256 (FIG. 2B). In FIG. 2B, processor system 258 executes scatter map process instructions 130 during the step Alice stores the noise $r_1 r_2 \ldots r_\rho$ in the noise (unoccupied) locations of $\mathcal{S} = (s_1 \ldots s_n)$ so that the one or more keys $k_1 k_2 \ldots k_m$ are hidden in the noise. In FIG. 2B, processor system 258 executes scatter map process instructions 130 during the step Bob uses scatter map $\pi$ to extract one or more keys $k_1 \ldots k_m$ from $\mathcal{S}$.

In an embodiment of process 2, output system 252 is used during the step Alice sends $\mathcal{S}$ to Bob. Output system 252 is part of sending machine 102 in FIG. 1A. In an embodiment of process 2, input system 254 is used during the step Bob receives $\mathcal{S}$. Input system 254 is a part of receiving machine 112 in FIG. 1A.

When the scatter size is n, process 1 takes n steps to hide the data inside the noise. When the scatter size is n, process 2 takes n steps to hide one or more keys inside the noise. When the bit-rate of a random noise generator is x bits per second, then a transmission with scatter size x bits is practical. When x=10,000, a key size of 2000 bits and noise size of 8000 bits is feasible. When x=20,000, a data size of 5000 bits and noise size of 1500 bits is feasible. In some applications, Alice and Bob may also establish the key size or data size m as a shared secret, where m is not disclosed to Eve.

In the interests of being conservative about the security, the mathematical analysis in section 7.9 assumes that Eve knows the data or key size m. For applications where Eve doesn't know m, the security will be stronger than the results obtained in the upcoming sections.

7.7 Effective Hiding

This section provides the intuition for effective hiding. Effective hiding occurs when Eve obtains no additional information about scatter map a after Eve observes multiple hidden key or hidden data transmissions. Section 7.8 provides mathematical analysis of this intuition.

The effectiveness of the hiding depends upon the following observation. Even after Eve executes a search algorithm for the data (signal) in the noise, Eve's search algorithm does NOT know when it has found the key or the data because her search algorithm CANNOT distinguish the signal from the noise. This is illustrated by FIGS. 5 and 6.

Figure 5:
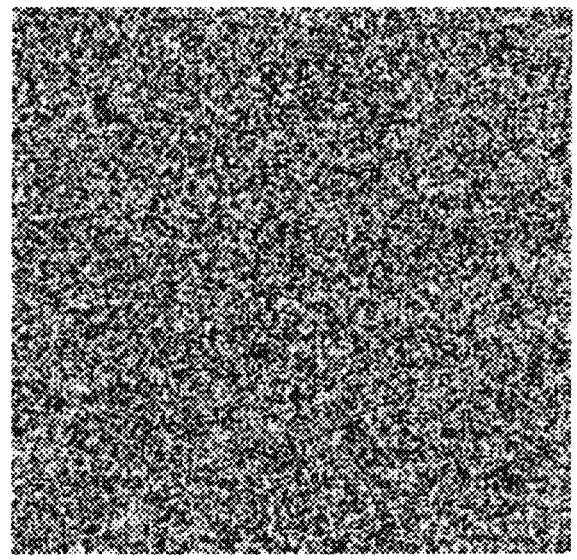
FIG. 5 shows key(s) hidden in random noise where the probability distribution of the key and the noise are uniform.
Figure 6:
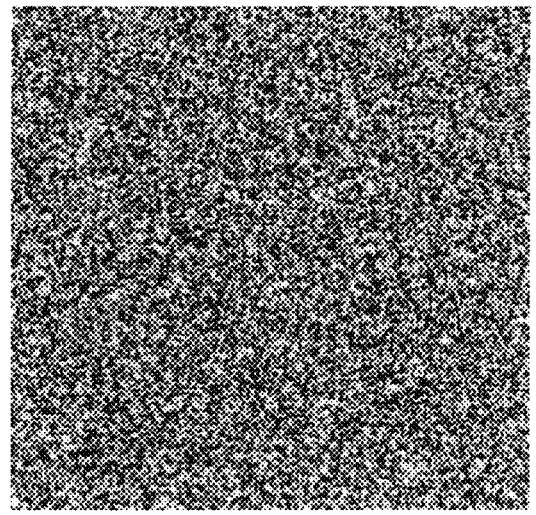
FIG. 6 shows a data hidden in random noise where the probability distribution of the data and the noise are uniform.

The pixel values in FIGS. 5 and 6 that compose the secret are hidden in the noise of the visual image such that the probabilities of the pixel values satisfy the two randomness axioms. Suppose Eve performs a brute force search over all $$\frac{n!}{(n-m)!}$$

possibilities for scatter map σ. Even if Eve's search method stumbles upon the correct sequence of locations, Eve's method has no basis for distinguishing the data from the noise because the key and noise probability distributions are equal. For FIG. 5, Eve does not have a terminating condition for halting with this sequence of bit locations hiding the key. For FIG. 6, Eve does not have a terminating condition for halting with this sequence of locations hiding the data.

Figure 7:
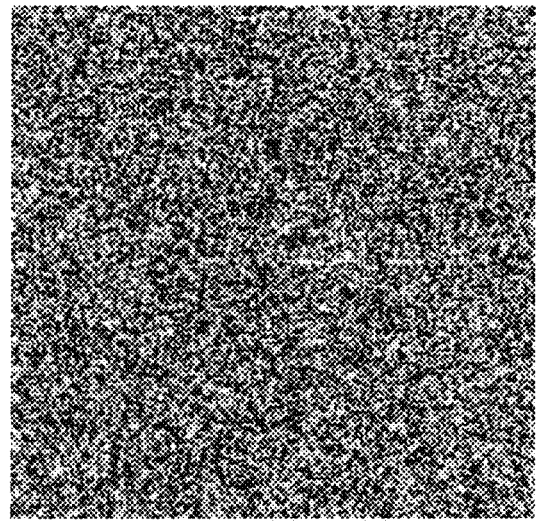
FIG. 7 shows a key hidden in random noise where the probability distribution of the key and the noise are not the same. The probability distribution of the key is somewhat biased.
Figure 8:
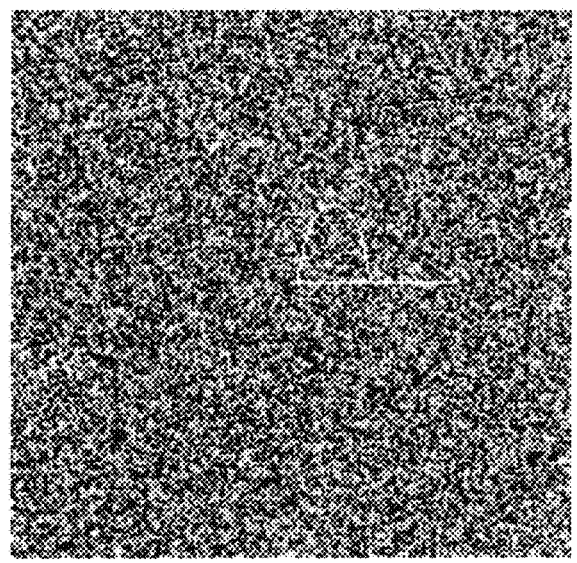
FIG. 8 shows data hidden in random noise where the probability distribution of the data and the noise are not the same. The probability distribution of the data is more biased.

In FIGS. 7 and 8, Eve can obtain some locations of the hidden data or hidden key because the probability distribution of the secret (foreground) is not the same as the noise (background): Eve can determine the secret is located in a P shape, because the probability distribution of these secret pixels violates the randomness axioms.

7.8 Multiple Scattered Data Transmissions

This section analyzes the mathematics of when a scatter map is safest to reuse for multiple, scattered transmissions. Suppose that scatter map $\pi \in \mathcal{L}_{m,n}$ is established with Alice and Bob, according to a uniform probability distribution and adversary Eve has no information about $\pi$. Before Eve sees the first scatter transmission from Alice to Bob, from Eve's perspective, the probability $$P(\pi = (l_1, l_2...l_m)) = \frac{(n-m)!}{n!}$$

for each $(l_1, l_2 \ldots l_m)$ in $\mathcal{L}_{m,n}$: in other words, Eve has zero information about $\pi$ with respect to $\mathcal{L}_{m,n}$.

Next, two rules are stated whose purpose is to design embodments that do not lead leak information to Eve. Section 7.11 shows some embodiments that authenticate the data or key(s) hidden in the noise. Embodiments that follow these rules help hinder Eve from actively sabotaging Alice and Bob to violate these rules.

Rule 1. New Noise and New Data

For each scattered transmission, described in process 1 or process 2, Alice creates new data $d_1 \ldots d_m$ or creates a new key $k_1 \ldots k_m$ and Alice also creates new noise $r_1 \ldots r_{n-m}$ from a random number generator that satisfies the no bias and history has no effect properties.

Rule 2. No Auxiliary Information

During the kth scattered transmission, Eve only sees scattered transmission $\mathcal{S}(k)$; Eve receives no auxiliary information from Alice or Bob. Scattered transmission $\mathcal{S}(k)$ represents the key(s) or data hidden in the noise.

Theorem 1.

When Eve initially has zero information about $\pi$ w.r.t. $\mathcal{L}_{m,n}$, and rules 1 and 2 hold, then Eve still has zero information about $\pi$ after she observes scattered transmissions $\mathcal{S}(1), \mathcal{S}(2), \ldots \mathcal{S}(k)$.

In a proof of theorem 1, the following terminology is used. i lies in $\pi=(l_1, l_2 \ldots l_m)$ if $i=l_j$ for some $1 \le j \le m$. Similarly, i lies outside $\pi$ if $i \ne l_j$ for every $1 \le j \le m$. In this latter case, i is a noise location.

PROOF. Consider the ith bit location in the scattered transmission. Let $x_i(k)$ denote the ith bit observed by Eve during the kth scattered transmission $\mathcal{S}(k)$. The scatter map $\pi$ is established before the first transmission based on a uniform probability distribution; rule 1 implies the data generation and noise generation obey the two properties of no bias and history has no effect, These rules imply the conditional probabilities $P(x_i(k+1)=1|x_i(k)=b)=\frac{1}{2}=P(x_i(k+1)=0|x_i(k)=b)$ hold for $b \in \{0,1\}$, independent of whether i lies in $\pi$ or i lies outside $\pi$. Rule 2 implies that if Eve's observation of $\mathcal{S}(1), \mathcal{S}(2), \ldots \mathcal{S}(k)$ enabled her to obtain some information, better than $$P(\pi = (l_1, l_2...l_m)) = \frac{(n-m)!}{n!},$$

about whether i lies in $\pi$ or i lies outside $\pi$, then this would imply that the probability distribution of the noise is distinct from the probability distribution of the data, which is a contradiction. □

Remark 2.

Theorem 1 is not true if the probability distribution of the noise is distinct from the probability distribution of the data.

In embodiments, remark 2 advises us not to let Alice violate rule 1: an example of what Alice should not do is send the same data or same key in multiple executions of process 1 or process 2 and the noise is randomly generated for each execution.

7.9 Single Transmission Analysis

The size of the location space is significantly greater than the data or key size. Even for values of n as small as 30, $$\frac{n!}{(n-m)!} >> 2^m.$$

The uniform distribution of the noise and the data generation and a large enough noise size poses Eve with the challenge that even after seeing the transmission $\mathcal{S}=(s_1 \ldots s_n)$, she has almost no more information about the data or key(s), than before the creation of $k_1 k_2 \ldots k_m$. The forthcoming analysis will make this notion of almost no more information more precise.

In some applications, Alice and Bob may also establish the data size m as a shared secret, where m is not disclosed to Eve. In the interests of being conservative about the security, $\pi$ is assumed that Eve knows the data size m. For applications where Eve doesn't know m, the information security will be stronger than the results obtained in this section.

Processes 1 and 2 are analyzed with counting and asymptotic results that arise from the binomial distribution. First, some preliminary definitions are established.

For $0 \le i \le n$, define $E_{i,n}=\{r \in \{0,1\}^n: \eta_1(r)=i\}$. When n=4, $E_{0,4}=\{0000\}$, $E_{1,4}=\{0001, 0010, 0100, 1000\}$, $E_{2,4}=\{0011, 0101, 0110, 1001, 1010, 1100\}$, $E_{3,4}=\{0111, 1011, 1101, 1110\}$ and $E_{4,4}=\{1111\}$. Note $$|E_{k,n}| = \frac{n!}{(n-k)!k!} = \binom{n}{k}.$$

The expression—ith element of $E_{k,n}$—refers to ordering the set $E_{k,n}$ according to an increasing sequence of natural numbers that each binary string represents and selecting the ith element of this ordering. For example, the 3rd element of $E_{2,4}$ is 0110.

In table 1, event $B_{i,j}$ refers to the ith data in $E_{j,m}$. Event $R_i$ refers to the set of random noise elements which have i ones, and the noise size is $\rho=n-m$. Event $A_i$ refers to a scatter $(s_1 \ldots s_n)$ which contains i ones.

Equation 7.1 follows from the independence of events $R_k$ and $B_{i,j}$.

$$P(R_k \cap B_{i,j}) = P(R_k) \cap P(B_{i,j}) \tag{7.1}$$

whenever $0 \le k \le \rho$ and $0 \le j \le m$ and $$1 \le l \le \binom{m}{j}.$$

Equation 7.2 follows from the definitions in table 1; $\eta_1(s_1 \ldots s_n) = \eta_1(r_1 \ldots r_\rho) + \eta_1(k_1 \ldots k_m)$; and the meaning of conditional probability.

$$P(A_k | B_{l,j}) = P(R_{k-j}) = \binom{\rho}{k-j} 2^{-\rho} \tag{7.2}$$

whenever $0 \le j \le \min\{k,m\}$ and $$1 \le l \le \binom{m}{j}.$$

A finite sample space and $$P\left(\bigcup_{j=0}^{m}\bigcup_{l=1}^{|E_{j,m}|} B_{l,j}\right) = 1$$

imply that each event $$A_k \subset \bigcup_{j=0}^{m}\bigcup_{l=1}^{|E_{j,m}|} B_{l,j}.$$

Furthermore, $B_{l_1,j_1} \cap B_{l_2,j_2} = \emptyset$ whenever $l_1 \neq l_2$ or $j_1 \neq j_2$ such that $0 \leq j_1, j_2 \leq m$ and $1 \leq l_1 \leq E_{j_1,m}$ and $1 \leq l_2 \leq E_{j_2,m}$. Thus, Bayes Law is applicable. Equation 7.3 follows from Bayes Law and the derivation below 7.3.

$$P(B_{l,j} | A_k) = \frac{\binom{\rho}{k-j}}{\sum_{b=0}^{\min\{k,m\}} \binom{m}{b}\binom{\rho}{k-b}} \quad (7.3)$$

whenever $0 \leq j \leq \min\{k,m\}$ and $$1 \leq l \leq \binom{m}{j}.$$

The mathematical steps that establish equation 7.3 are shown below.

$$P(B_{l,j} | A_k) = \frac{P(B_{l,j})P(A_k | B_{l,j})}{\sum_{b=0}^{\min\{k,m\}} \sum_{a=1}^{|E_{b,m}|} P(B_{a,b})P(A_k | B_{a,b})}$$

$$= \frac{P(A_k | B_{l,j})}{\sum_{b=0}^{\min\{k,m\}} \sum_{a=1}^{|E_{b,m}|} P(A_k | B_{a,b})}$$

$$= \frac{\binom{\rho}{k-j} 2^{-\rho}}{\sum_{b=0}^{\min\{k,m\}} |E_{b,m}| \binom{\rho}{k-b} 2^{-\rho}}.$$

Definition 4

Let c be a positive integer. $f: \mathbb{N} \to \mathbb{N}$ is called a binomial c-standard deviations function if there exists $N \in \mathbb{N}$ such that whenever $\rho \geq N$, then $$\left|f(\rho) - \frac{\rho}{2}\right| \leq c\frac{\sqrt{\rho}}{2}$$

Define the function $$h_c(\rho) = \max\left\{0, \frac{\rho}{2} - \left\lfloor c\frac{\sqrt{\rho}}{2}\right\rfloor\right\}.$$

The $h_c$ is a binomial c-standard deviations function. Lemmas 2 and 3 may be part of the binomial distribution folklore; for the sake of completeness, they are proven below.

Lemma 2.

Let $k: \mathbb{N} \to \mathbb{N}$ be a binomial c-standard deviations function. Then $$\lim_{\rho \to \infty} \frac{\binom{\rho}{k(\rho)-1}}{\binom{\rho}{k(\rho)}} = 1.$$

PROOF. A simple calculation shows that $$\frac{\binom{\rho}{k(\rho)-1}}{\binom{\rho}{k(\rho)}} = \frac{k(\rho)}{\rho - k(\rho) + 1}.$$

Since $k(\rho)$ is a binomial c-standard deviations function, $$\frac{\rho}{2} - \frac{c\sqrt{\rho}}{2} \leq k(\rho) \leq \frac{\rho}{2} + \frac{c\sqrt{\rho}}{2}.$$

This implies $$\frac{\rho}{2} + \frac{c\sqrt{\rho}}{2} + 1 \geq \rho - k(\rho) + 1 \geq \frac{\rho}{2} - \frac{c\sqrt{\rho}}{2}.$$

Thus, $$\frac{\frac{\rho}{2} - \frac{c\sqrt{\rho}}{2}}{\frac{\rho}{2} + \frac{c\sqrt{\rho}}{2} + 1} \leq \frac{\binom{\rho}{k(\rho)-1}}{\binom{\rho}{k(\rho)}} \leq \frac{\frac{\rho}{2} + \frac{c\sqrt{\rho}}{2}}{\frac{\rho}{2} - \frac{c\sqrt{\rho}}{2}}$$

(7.4) Since $$\lim_{\rho \to \infty} \frac{\frac{e}{2} - \frac{c\sqrt{\rho}}{2}}{\frac{e}{2} + \frac{c\sqrt{\rho}}{2} + 1} = 1 = \lim_{\rho \to \infty} \frac{\frac{e}{2} + \frac{c\sqrt{\rho}}{2}}{\frac{e}{2} - \frac{c\sqrt{\rho}}{2}},$$

apply the squeeze theorem to equation 7.4. □

The work from lemma 2 helps prove lemma 3. Lemma 3 helps prove that equation 7.3 converges to $2^{-m}$ when $k(\rho)$ is a binomial c-standard deviations function.

Lemma 3.

Fix $m \in \mathbb{N}$. Let $k: \mathbb{N} \to \mathbb{N}$ be a binomial c-standard deviations function. For any b,j such that $0 \leq b, j \leq m$, then $$\lim_{\rho \to \infty} \frac{\binom{\rho}{k(\rho)-j}}{\binom{\rho}{k(\rho)-b}} = 1.$$

PROOF. Using a similar computation to equation 7.4 inside of c+1 standard deviations instead of c, then $\rho$ can be made large enough so that $k(\rho)-b$ and $k(\rho)-j$ lie within c+1 standard deviations so that $$\lim_{\rho \to \infty} \frac{\binom{\rho}{k(\rho)-i-1}}{\binom{\rho}{k(\rho)-i}} = 1$$

where $0 \le i \le m$. W.L.O.G., suppose $j<b$. Thus, $$\lim_{\rho \to \infty} \frac{\binom{\rho}{k(\rho)-j}}{\binom{\rho}{k(\rho)-b}} =$$

$$\lim_{\rho \to \infty} \frac{\binom{\rho}{k(\rho)-j}}{\binom{\rho}{k(\rho)-(j+1)}} \lim_{\rho \to \infty} \frac{\binom{\rho}{k(\rho)-(j+1)}}{\binom{\rho}{k(\rho)-(j+2)}} \cdots \lim_{\rho \to \infty} \frac{\binom{\rho}{k(\rho)-(b-1)}}{\binom{\rho}{k(\rho)-b}} = 1$$

Theorem 4.

Fix data size $m \in \mathbb{N}$. Let $c \in \mathbb{N}$. Let $k: \mathbb{N} \to \mathbb{N}$ be a binomial c-standard deviations function. Then $$\lim_{\rho \to \infty} P(B_{l,j} | A_{k(\rho)}) = 2^{-m}.$$

PROOF.

$$\lim_{\rho \to \infty} P(B_{l,j} | A_{k(\rho)}) = \lim_{\rho \to \infty} \left[ \frac{\sum_{b=0}^{\min\{k(\rho),m\}} \binom{m}{b}\binom{\rho}{k(\rho)-b}}{\binom{\rho}{k(\rho)-j}} \right]^{-1} \text{ from equation 7.3.}$$

$$= \left[ \sum_{b=0}^{m} \binom{m}{b} \lim_{\rho \to \infty} \frac{\binom{\rho}{k(\rho)-b}}{\binom{\rho}{k(\rho)-j}} \right]^{-1}$$

since $m$ is fixed and $\rho \to \infty$ implies $k(\rho) > m$.

$$= -2^{-m} \text{ from lemma 2.} \square$$

Remark 3.

Theorem 4 is not true when $k(\rho)$ stays on or near the boundary of Pascal's triangle. Consider $$\lim_{\rho \to \infty} \frac{\binom{\rho}{0}}{\binom{\rho}{1}} = 0 \text{ or } \lim_{\rho \to \infty} \frac{\binom{\rho}{1}}{\binom{\rho}{2}} = 0.$$

The math confirms common sense: namely, if Eve sees event $A_0$, then Eve knows that Alice's data is all zeroes. A practical and large enough noise size enables process 1 or process 2 to effectively hide the data transmission so that outlier events such as $A_0$, $A_1$ do not occur in practice. For example, when n=2048, $P(A_0)=2^{-2048}$ and $P(A_1)2^{-2037}$.

Definitions 5, 6 and theorems 5, 6 provide a basis for calculating how big the noise size should be in order to establish an extremely low probability that Eve will see outlier events such as $A_0$.

Definition 5

$f: \mathbb{N} \to \mathbb{N}$ is an binomial $\epsilon$-tail function if there exists $N \in \mathbb{N}$ such that $n \ge N$ implies that $$2^{-n}\left(\sum_{k=0}^{f(n)} \binom{n}{k} + \sum_{k=n-f(n)}^{n} \binom{n}{k}\right) < \epsilon.$$

The area under the standard normal curve from $-\infty$ to x is expressed as $$\Phi(x) = \frac{1}{\sqrt{2\pi}} \int_{-\infty}^{x} e^{-\frac{1}{2}t^2} dt.$$

Theorem 5.

For each $c \in \mathbb{N}$, set $\epsilon_c = 4\Phi(-c)$. The function $$g_c(n) = \max\left\{0, \left\lfloor \frac{n}{2} - c\frac{\sqrt{n}}{2} \right\rfloor\right\}$$

is a binomial $\epsilon_c$-tail function.

PROOF. This is an immediate consequence of the central limit theorem [26, 27], applied to the binomial distribution. Some details are provided.

Define $$B_n(x) = 2^{-n} \sum_{k=0}^{\lfloor x \rfloor} \binom{n}{k}.$$

In [28] DeMoivre proved for each fixed x that $$\lim_{n \to \infty} B_n\left(\frac{n}{2} + x\frac{\sqrt{n}}{2}\right) = \Phi(x).$$

Thus, $$\lim_{n\to\infty} 2^{-n} \sum_{k=0}^{g_c(n)} \binom{n}{k} = \frac{1}{\sqrt{2\pi}} \int_{-\infty}^{-c} e^{-\frac{1}{2}t^2} dt.$$

Now $\epsilon_c$ is four times the value of $$\frac{1}{\sqrt{2\pi}} \int_{-\infty}^{-c} e^{-\frac{1}{2}t^2} dt,$$

which verifies that $g_c$ is a binomial $\epsilon_c$-tail function. □

EXAMPLE 1

This example provides some perspective on some $\epsilon$-tails and Eve's conditional probabilities. For n=2500, the scatter mean $\mu$ is 1250 and the standard deviation $$\sigma = \frac{\sqrt{2500}}{2} = 25.$$

Set c=20, so $\mu - c\sigma = 750$. A calculation shows that $$2^{-2500} \sum_{j=0}^{750} \binom{2500}{j} < 10^{-91}.$$

For n=4096, the scatter mean is 2048 and the standard deviation $\sigma=32$. Set c=50 standard deviations, so $\mu - c\sigma = 448$. A calculation shows that $$2^{-4096} \sum_{j=0}^{448} \binom{4096}{j} < 10^{-621}.$$

Some of Eve's conditional probabilities are calculated for n=2500 and data size m=576. The average number of 1's in a key is $\mu_{key}=288$ and the standard deviation $\sigma_{key}=12$.

A typical case is when j=300 and k=1275, which are both one standard deviation to the right of the data and scatter mean, respectively. When Eve's conditional probability equals $2^{-m}$, the secrecy ratio is exactly 1. Using equation 7.3, a computer calculation shows that the secrecy ratio is $$\frac{P(B_{l,300}|A_{1275})}{2^{-576}} \approx 1.576,$$

so $2^{-576} < P(B_{l,300}|A_{1275}) < 2^{-575}$.

A rare event is when j=228 and k=1225. That is, j=228 is five standard deviations to the left of $\mu_{key}$, and k=1225 is one standard deviation to the left of the scatter mean. A calculation shows that $$\frac{P(B_{l,228}|A_{1225})}{2^{-576}} \approx 0.526.$$

Thus, $2^{-577} < P(V_{l,228}|A_{1225}) < 2^{-576}$.

An extremely rare event occurs when j=228 and k=1125. Event $A_{1125}$ is 4 standard deviations to the left.

$$\frac{P(B_{l,228}|A_{1125})}{2^{-576}} \approx 3840.$$

Thus, $2^{-565} < P(B_{l,228}|A_{1125}) < 2^{-564}$. While a secrecy ratio of 3840 is quite skew, it still means that even if Eve sees a scatter transmission 4 standard deviations to the left, there is still a probability in the interval [$2^{-565}$, 2-564] of Alice's data element being the event $B_{l,228}$.

Even when Eve sees a highly skewed, scattered transmission and obtains some information about the current hidden data element, Eve's observation provides her with no information about the next data element hidden in a subsequent transmission. The secrecy ratio calculations in example 1 provide the motivation for definition 6.

Definition 6

Let $\epsilon > 0$. Eve's conditional probabilities $P(B_{l,j}|A_{k(\rho)})$ are $\epsilon$-close to perfect secrecy if there exists a binomial $\epsilon$-tail function $f$ such that for any function $k: \mathbb{N} \to \mathbb{N}$ satisfying $f(\rho) \leq k(\rho) \leq \rho - f(\rho)$, then $$\lim_{\rho \to \infty} P(B_{l,j}|A_{k(\rho)}) = 2^{-m}.$$

Theorem 6.

For any $\epsilon > 0$, there exists $M \in \mathbb{N}$ such that $\epsilon_c < \epsilon$ for all $c \geq M$ and $c \in \mathbb{N}$. Furthermore, function $g_c$ is a binomial $\epsilon_c$-tail function that makes Eve's conditional probabilities $P(B_{l,j}|A_{k(\rho)})$ $\epsilon_c$-close to perfect secrecy, where $g_c(\rho) \leq k(\rho) \leq \rho - g_c(\rho)$.

PROOF. Since $$\lim_{x \to \infty} \Phi(-x) = 0,$$

there exists $M \in \mathbb{N}$ such that $\epsilon_c < \epsilon$ for all $c \geq M$. Recall that $$h_c(\rho) = \max\left\{0, \frac{\rho}{2} - \left\lfloor c\frac{\sqrt{\rho}}{2} \right\rfloor\right\}.$$

For all $\rho \in \mathbb{N}$, $|g_c(\rho) - h_c(\rho)| \leq 1$ and $g_c(4\rho^2) - h_c(4\rho^2) = 0$. This fact and $h_c$ is a binomial c-standard deviations function together imply that lemma 3 and hence theorem 4 also hold for function $g_c$. That is $$\lim_{\rho \to \infty} P(B_{l,j}|A_{g_c(\rho)}) = 2^{-m}.$$

Whenever function k satisfies $g_c(\rho) \leq k(\rho) \leq \rho - g_c(\rho)$, this implies k is a binomial c+1-standard deviations function. Thus, this theorem immediately follows from theorems 4, 5 and from definition 6. □

7.10 Data Transformations

In some embodiments, the key or data may be transformed by the sender (Alice) before being scattered and subsequently transmitted to the receiver (Bob). In an embodiment, each bit of the key or the data may be transformed according to the map $\Phi: \{0,1\} \to \{01, 10\}$ where $\Phi(0) = 01$ and $\Phi(1) = 10$. Suppose the data is K=010010000.

$\Phi^{-1}$ denotes the inverse of $\Phi$. The inverse of $\Phi$ is used by Bob to reconstruct the data $d_1 d_2 \ldots d_m$ from the transformed data $t_1 t_2 \ldots t_2$, after Bob extracts $t_1 t_2 \ldots t_2$, from the scattered transmission received from Alice. Note that $\Phi^{-1}(01)=0$ and $\Phi^{-1}(10)=1$. In some embodiments, data transformation instructions 126, shown in FIG. 1B, compute map $\Phi$ and inverse map $\Phi^{-1}$.

After applying $\Phi$ to each bit of K, the transformation is $\Phi(0)\Phi(1)\Phi(0)\Phi(0)\Phi(1)\Phi(0)\Phi(0)\Phi(0)\Phi(0)=01\ 10\ 01\ 01\ 10\ 01\ 01\ 01\ 01$. After this transformation by $\Phi$, each of these 18 bits is scattered inside random noise. Suppose K is scattered inside of 130 bits of noise, then the location space will be $\mathcal{L}_{18,148}$. A scatter map $\pi$ in $\mathcal{L}_{18,148}$ has 18 locations. That is, $\pi=(l_1, l_2, \ldots l_{18})$ and each $l_i$ satisfies $1 \le l_i \le 148$.

FIG. 12 shows an embodiment with $l_1=37$, $l_2=29$, $l_{17}=4$ and $l_{18}=147$. In other embodiments, when the $\Phi$ transformation is used, for a data size m, a scatter map is selected from $\mathcal{L}_{2m,n}$ to hide the transformed 2m, bits inside of n−2m, bits of random noise. In an embodiment, the data size may be m=32. In another embodiment, the data size may be m=128. In another embodiment, the data size may be m=1000. In another embodiment, the data size may be m=4096. In another embodiment, the data size may be m=512000.

In alternative embodiments, the map $\Psi:\{0,1\}\to\{01,10\}$ where $\Psi(0)=10$ and $\Psi(1)=01$, may be used to transform the data before scattering (hiding) the data inside the noise. In an embodiment, the map $\Psi$ transforms the 16 bits of data 0100 1110 1001 0110 to a 32-bit transformation 10011010 01010110 01101001 10010110, before this 32-bit transformation is scattered by the sender (Alice) inside of random noise. After Bob extracts the transformed data 10011010 01010110 01101001 10010110 from the scattered transmission, Bob applies the inverse of $\Psi$ to each substring of two bits. For the first two bits, $\Psi^{-1}(10)=0$, so $d_1=0$. For bits 3 and 4, Bob computes $\Psi^{-1}(01)=1$, so Bob reconstructs $d_2=1$. For bits 5 and 6, Bob computes $\Psi^{-1}(10)=0$, so his third reconstructed data bit $d_3=0$. Bob continues this reconstruction of the 16th bit of data with bits 31 and 32 and computes $\Psi^{-1}(10)=0$, and reconstructs bit $d_{16}=0$. In some embodiments, data transformation instructions 126, shown in FIG. 1B, compute map $\Psi$ and inverse map $\Psi^{-1}$.

Before the scatter map process using a data transformation is started, an element $\pi \in \mathcal{B}_{2m,n}$ is randomly selected and securely distributed to Alice and Bob. Note 2m<n.

Hiding Process 3. Scatter Map Method using a Data Transformation $\Psi$

Alice and Bob already have secret scatter map $\pi=(l_1, l_2, \ldots l_{2m})$.

A Alice generates data $d_1 d_2 \ldots d_m$ and noise $r_1 r_2 \ldots r_{n-2m}$ from her random noise generator.

B Alice transforms data $d_1 d_2 \ldots d_m$ to $t_1 t_2 \ldots t_{2m}$ with transformation $\Psi$.

C According to definition $\mathcal{3}$, Alice uses $\pi$ to set $s_{l_1}=t_1 \ldots s_{l_{2m}}=t_{2m}$.

D Per definition $\mathcal{3}$, Alice stores the noise at noise (unoccupied) locations in $\mathcal{S}=(s_1 \ldots s_n)$ so that the transformed data is hidden inside the noise.

E Alice sends $\mathcal{S}=(s_1 \ldots s_m)$ to Bob.

F Bob uses scatter map $\pi$ to extract the transformed data $t_1 \ldots t_{2m}$ from $\mathcal{S}$.

G Bob applies the inverse of $\Psi$ to $t_1 \ldots t_{2m}$ and reads data $d_1 d_2 \ldots d_m$.

7.11 Hiding Data Elements with Authentication

It is assumed that Alice and Bob have previously established secret scatter map $\sigma=(l_1, l_2, \ldots l_m)$ and authentication key $\kappa$. In some embodiments, Alice and Bob may establish scatter map $\sigma$ and authentication key $\kappa$ with a Diffie-Hellman-Merkle exchange [29, 30], where their public keys are signed in a secure computing or private manufacturing environment; alternatively, in other embodiments, Alice and Bob may establish $\sigma$ and $\kappa$ via a different channel or in the same physical location by a face to face exchange or using a physical delivery by a mutually trusted courier.

Let $h_\kappa$ denote an MAC (e.g., HMAC [31] or [32]) function which will be used to authenticate the scattered transmission. The use of $h_\kappa$ helps hinder the following attack by Eve. An active Eve could flip a bit at bit location l in the scattered transmission. If no authentication occurs on the noise and the hidden key bits, then upon Alice resending a scattered transmission due to Alice and Bob not arriving at the same session key secret, Eve gains information that l lies in $\sigma$. If the scattered transmission $\mathcal{S}$ is not authenticated, Eve's manipulation of the bits in $\mathcal{S}$ helps her violate rule 2.

Hiding Process 4. Hiding One or More Keys with Authentication

Alice's random generator creates one or more keys $k_1 k_2 \ldots k_m$ and random noise $r_1 r_2 \ldots r_\sigma$.

Per definition $\mathcal{3}$, Alice uses scatter map $\sigma$ to set $S_{l_1}=k_1 \ldots s_{l_m}=k_m$.

Alice stores the noise $r_1 r_2 \ldots r_\rho$ at noise (unoccupied) locations in $\mathcal{S}=(s_1 \ldots s_m)$ so that her one or more keys $k_1 k_2 \ldots k_m$ are hidden inside the noise.

Alice sends $\mathcal{S}$ and $h_\kappa(\mathcal{S})$ to Bob.

Bob receives $\mathcal{S}'$ and $h_\kappa(\mathcal{S})$ from Alice. Bob computes $h_\kappa(\mathcal{S}')$ and checks it against $\mathcal{S}_\kappa(\mathcal{S})$.

If $h_\kappa(\mathcal{S}')$ is valid, Bob uses scatter map $\sigma$ to extract one or more keys $k_1 \ldots k_m$ from $\mathcal{S}$; else Bob rejects $\mathcal{S}'$ and asks Alice to resend $\mathcal{S}$.

In some embodiments of process 4, scatter map $\sigma$ is executed by scatter map instructions 130 (FIG. 1B) and these instructions follow definition 3. In some embodiments of process 4, Alice's random noise generator is implemented with random noise generator 128 (FIG. 1B). In some embodiments of process 4, Alice's random noise generator uses a light emitting diode as shown in FIGS. 9A and 10. In some embodiments of process 4, the key $k_1 \ldots k_m$ has no bias and has the same probability distribution as the noise $r_1 r_2 \ldots r_\rho$. In some embodiments of process 4, the data elements $e_1 \ldots e_m$ are encrypted plaintext data instead of a key.

In some embodiments of process 4, the probability distribution of the data elements is biased and the probability distribution of the noise is biased. In preferred embodiments, the probability distribution of the data elements is the same as the probability distribution of the noise even though they are both biased. In some embodiments, the probability distribution of the data elements is almost the same the probability distribution of the noise. Almost the same probability distribution means that an average hacker that is eavesdropping on the hidden data transmissions would not be able to find where the data is being hidden after a seeing the hidden transmissions for a reasonable amount of time. In an embodiment, a reasonable amount of time is 3 months. In another embodiment, a reasonable amount of time is 1 year. In another embodiment, a reasonable amount of time is 5 years.

In other embodiments, Alice encrypts plaintext data $d_1, \ldots d_m$ with a block or stream cipher before the encrypted data $e_1, \ldots e_m$ is hidden in random noise; this is described in process 5 below.

Hiding Process 5. Hiding Encrypted Data Elements with Authentication

Alice's uses encryption algorithm $\mathcal{E}$ and key K to encrypt data $M=d_1 d_2 \ldots d_m$ as $\mathcal{E}(M,K)=e_1 e_2 \ldots e_m$.

Per definition $\mathcal{3}$, Alice uses scatter map σ to set $s_{l_1}=e_1 \ldots s_{l_m}=e_m$.

Alice's random noise generator creates noise $r_1 r_2 \ldots r_\rho$.

Alice stores the noise $r_1 r_2 \ldots r_\rho$ at noise (unoccupied) locations in $\mathcal{S}=(s_1 \ldots s_n)$ so that the encrypted data $e_1 e_2 \ldots e_m$ is hidden inside the noise.

Alice sends $\mathcal{S}$ and $h_\kappa(\mathcal{S})$ to Bob.

Bob receives $\mathcal{S}'$ and $h_\kappa(\mathcal{S})$ from Alice. Bob computes $h_\kappa(\mathcal{S}')$ and checks it against $h_\kappa(\mathcal{S})$.

If $h_\kappa(\mathcal{S}')$ is valid, Bob uses scatter map σ to extract $e_1 \ldots e_m$ from $\mathcal{S}$ and subsequently uses decryption algorithm $\mathcal{S}$ and key K to decrypt $e_1 \ldots e_m$ and obtain $d_1 \ldots d_m$.

else Bob rejects $\mathcal{D}'$ and asks Alice to resend $\mathcal{S}$.

In some embodiments of process 5, catter map σ is executed by scatter map instructions 130 (FIG. 1B) and these instructions follow definition 3. In some embodiments of process 5, Alice's random noise generator is implemented with random noise generator 128 (FIG. 1B). In some embodiments of process 5, Alice's random noise generator uses a light emitting diode as shown in FIGS. 9 and 10. In some embodiments, the encrypted data $e_1 \ldots e_m$ has no bias and has the same probability distribution as the noise $r_1 r_2 \ldots r_\rho$.

In some embodiments of process 5, encryption algorithm $\mathcal{E}$ is the block cipher Serpent [14] and is executed with cipher instructions 129 as shown in FIG. 1B. In some embodiments of process 5, encryption algorithm $\mathcal{E}$ is the block cipher AES [13], and is executed with cipher instructions 129.

In some embodiments of process 5, encryption algorithm $\mathcal{E}$ is a block cipher and also uses the cipher block chaining mode. In some embodiments of process 5, encryption algorithm $\mathcal{E}$ is a stream cipher.

7.12 Some Complexity Analysis of Hidden Encrypted Data

Suppose that the encrypted data element $e_1 e_2 \ldots e_{128}$ has 128 bits and these bits are hidden inside of 128 bits $r_1 r_2 \ldots r_{128}$ of random noise. In an embodiment following process 5, block cipher Serpent is executed with cipher instructions 126 to encrypt the data element as $e_1 e_2 \ldots e_{128}$ before scatter map instructions 130 are applied to hide encrypted bits $e_1 e_2 \ldots e_{128}$ in random noise $r_1 r_2 \ldots r_{128}$ produced by random number generator 128.

The hiding of encrypted bits $e_1 e_2 \ldots e_{128}$ by scatter map instructions 130 is shown in FIG. 11. Each encrypted data element is 16 bytes. In FIG. 11, the scatter size n=256 bits. For a scatter size of n=256, there are 256 possible locations to hide the first bit $e_1$; 255 locations to hide the second bit $e_2$; ...; and 129 locations to hide the 128th bit of encrypted data element $e_{128}$. Note that $|\mathcal{L}_{128,256}|>10^{192}$. The complexity $10^{192}$ of finding the scatter map σ in $\mathcal{L}_{128,256}$ is substantially greater than the complexity of Serpent which is at most $2^{256}<10^{77}$. In embodiments where more the noise size is larger, the complexity of finding the scatter map can be much greater than $10^{192}$.

When Eve does not receive any auxiliary information (that is, rule 2 holds), it is extremely unlikely that Eve can extract any information about the bit locations even after Eve observes 625,000 encrypted data elements, each hidden in 128 bits of noise. If Eve has the computing power to brute-force search through each element $\sigma \in \mathcal{L}_{128,256}$ and subsequently to find data element $e_1 \ldots e_{128}$, Eve still has no way of knowing if this particular σ is the one that Alice used to hide encrypted bits $e_1 e_2 \ldots e_{128}$. Eve needs some auxiliary information.

7.13 The Scatter Map Process Hides One-Time Locks

Consider the following cryptographic method. Alice places her one-time lock a on message m and transmits m⊕a to Bob. Bob applies his one-time lock b and sends m⊕a⊕b back to Alice. Alice removes her lock, by applying a to m⊕a⊕b and sends m⊕b back to Bob. Bob removes lock b from m⊕b to read message m. This method of one-time locks is vulnerable if Eve can see the three transmissions m⊕a, m⊕a⊕b and m⊕b because Eve can compute m=(m⊕a)⊕(m⊕a⊕b)⊕(m⊕b).

In an embodiment, process 6 protects these one-time locks by using two distinct and independent scatter maps $\pi_A$, $\pi_B$ to hide each transmission inside a new generation of random noise. Independent means that any information given to Eve about $\pi_B$ tells Eve nothing about $\pi_A$ and vice versa. In terms of conditional probabilities, independence means $P(\pi_A=(l_1 \ldots l_\kappa) \in \mathcal{L}_{\kappa,n} | \pi_B=(j_1 \ldots j_\kappa))=P(\pi_A=(l_1 \ldots l_\kappa) \in \mathcal{L}_{\kappa,n})$. Using these independent scatter maps, Eve is no longer able to see the three transmissions m⊕a, m⊕a⊕b and m⊕b because the encrypted data m⊕a, and the twice encrypted data m⊕a⊕b and the second party encrypted data m⊕b are each hidden inside of a new generation of random noise.

Hiding Process 6. Scattered One Time Locks

---

Alice and Bob possess secret scatter maps $\pi_A = (l_1, l_2 \ldots l_\kappa)$, $\pi_B = (j_1, j_2 \ldots j_\kappa) \in \mathcal{L}_{\kappa,n}$.

Eve does not know κ and $\pi_A$ and $\pi_B$.

while Alice has more κ-bit message blocks $m_1 m_2 \ldots m_\kappa$ to encrypt
{
  Alice generates her lock $a_1 a_2 \ldots a_\kappa$ and noise $r_1 r_2 \ldots r_{n-\kappa}$ from her random noise generator.
  Per definition $\mathcal{3}$, Alice uses $\pi_A$ to set $s_{l_1} = a_1 \oplus m_1 \ldots s_{l_\kappa} = a_\kappa \oplus m_\kappa$.
  Using noise $r_1 r_2 \ldots r_\kappa$ Alice completes scatter $\mathcal{S} = (s_1 \ldots s_n)$ and sends
  to Bob.
  Bob extracts $a_1 \oplus m_1 \ldots a_\kappa \oplus m_\kappa$ from $\mathcal{S}$, using scatter map $\pi_A$.
  Bob generates his lock $b_1 b_2 \ldots b_\kappa$ and noise $q_1 q_2 \ldots q_{n-\kappa}$ from his random noise generator.
  Per definition $\mathcal{3}$, Bob uses $\pi_B$ to set $t_{j_1} = b_1 \oplus a_1 \oplus m_1 \ldots t_{j_\kappa} = b_\kappa \oplus a_\kappa \oplus m_\kappa$.
  Using noise $q_1 q_2 \ldots q_\kappa$ Bob completes scatter $\mathcal{T} = (t_1 \ldots t_n)$ and sends
  to Alice.
  Alice extracts $b_1 \oplus a_1 \oplus m_1 \ldots b_\kappa \oplus a_\kappa \oplus m_\kappa$ from $\mathcal{T}$, using scatter map $\pi_B$.
  Alice removes her lock $a_1 \ldots a_\kappa$ by computing $a_1 \oplus (b_1 \oplus a_1 \oplus m_1) \ldots a_\kappa \oplus (b_\kappa \oplus a_\kappa \oplus m_\kappa)$. Alice generates noise $p_1 p_2 \ldots p_{n-\kappa}$ from her random noise generator.
  Per definition $\mathcal{3}$, Alice uses $\pi_A$ to set $u_{l_1} = b_1 \oplus m_1 \ldots u_{l_\kappa} = b_\kappa \oplus m_\kappa$.
  Using noise $p_1 p_2 \ldots p_\kappa$ Alice completes scatter $\mathcal{U} = (u_1 \ldots u_n)$ and sends
  to Bob.
  Bob extracts $b_1 \oplus m_1 \ldots b_\kappa \oplus m_\kappa$ from $\mathcal{U}$, using scatter map $\pi_A$.
  Bob removes his lock b1 ... $b_\kappa$ by computing $b_1 \oplus (b_1 \oplus m_1) \ldots b_\kappa \oplus (b_\kappa \oplus m_\kappa)$.
}

---

In an alternative embodiment, Alice and Bob use a third, distinct scatter map $\pi_C$, created independently from $\pi_A$ and $\pi_B$. Scatter map $\pi_C$ helps Alice scatter $b_1 \oplus m_1 \ldots b_\kappa \oplus m_\kappa$ after removing her lock. This alternative embodiment is shown in process 7.

Hiding Process 7. Scattered One Time Locks with 3 Scatter Maps

---

Alice and Bob possess secret scatter maps $\pi_A = (l_1, l_2, \ldots l_\kappa)$, $\pi_B = (j_1, j_2, \ldots j_\kappa) \in \mathcal{L}_{\kappa,n}$ and $\pi_C = (i_1, i_2 \ldots i_\kappa) \in \mathcal{L}_{\kappa,n}$
Eve does not know $\pi_A$ and $\pi_B$ and $\pi_C$.
while Alice has more $\kappa$-bit message blocks $m_1 m_2 \ldots m_\kappa$ to encrypt
{
  Alice generates her lock $a_1 a_2 \ldots a_\kappa$ and noise $r_1 r_2 \ldots r_{n-\kappa}$ from her random noise generator.
  Per definition 3, Alice uses $\pi_A$ to set $s_{l_1} = a_1 \oplus m_1 \ldots s_{l_\kappa} = a_\kappa \oplus m_\kappa$.
  Using noise $r_1 r_2 \ldots r_\kappa$ Alice completes scatter $\mathcal{S} = (s_1 \ldots s_n)$
  Alice sends $\mathcal{S} = (s_1 \ldots s_n)$ to Bob.
  Bob extracts $a_1 \oplus m_1 \ldots a_\kappa \oplus m_\kappa$ from $\mathcal{S}$, using scatter map $\pi_A$.
  Bob generates his lock $b_1 b_2 \ldots b_\kappa$ and noise $q_1 q_2 \ldots q_{n-\kappa}$ from his random noise generator.
  Per definition 3, Bob uses $\pi_B$ to set $t_{j_1} = b_1 \oplus a_1 \oplus m_1 \ldots t_{j_\kappa} = b_\kappa \oplus a_\kappa \oplus m_\kappa$.
  Using noise $q_1 q_2 \ldots q_\kappa$ Bob completes scatter $\mathcal{T} = (t_1 \ldots t_n)$ and send to
  Alice.
  Alice extracts $b_1 \oplus a_1 \oplus m_1 \ldots b_\kappa \oplus a_\kappa \oplus m_\kappa$ from $\mathcal{T}$, using scatter map $\pi_B$.
  Alice removes her lock $a_1 \ldots a_\kappa$ by computing $a_1 \oplus (b_1 \oplus a_1 \oplus m_1) \ldots a_\kappa \oplus (b_\kappa \oplus a_\kappa \oplus m_\kappa)$. Alice generates noise $p_1 p_2 \ldots p_{n-\kappa}$ from her random noise generator.
  Per definition 3, Alice uses $\pi_C$ to set $u_{i_1} = b_1 \oplus m_1 \ldots u_{i_\kappa} = b_\kappa \oplus m_\kappa$.
  Using noise $p_1 p_2 \ldots p_\kappa$ Alice completes scatter $\mathcal{U} = (u_1 \ldots u_n)$ and sends
  to Bob.
  Bob receives $\mathcal{U} = (u_1 \ldots u_n)$.
  Bob extracts $b_1 \oplus m_1 \ldots b_\kappa \oplus m_\kappa$ from $\mathcal{U}$, using scatter map $\pi_C$.
  Bob removes his lock $b_1 \ldots b_\kappa$ by computing $b_1 \oplus (b_1 \oplus m_1) \ldots b_\kappa \oplus (b_\kappa \oplus m_\kappa)$.
}

---

In an embodiment of process 7, scatter maps $\pi_A$, $\pi_B$ and $\pi_C$ are executed by scatter map instructions 130 (FIG. 1B) and these instructions follow definition 3. In FIG. 2B, processor system 258 executes scatter map process instructions 130 during the execution of scatter maps $\pi_A$, $\pi_B$ and $\pi_C$. In an embodiment, scatter map process instructions 130 for $\pi_A$, $\pi_B$ and $\pi_C$ are stored in memory system 256 (FIG. 2B).

In an embodiment of process 7, output system 252 in FIG. 2B is used during the step Alice sends $\mathcal{S} = (s_1 \ldots s_n)$ to Bob. Output system 252 is part of sending machine 102 in FIG. 1A. In an embodiment of process 7, input system 254 in FIG. 2B is used during the step Bob receives $\mathcal{U} = (u_1 \ldots u_n)$. Input system 254 is a part of receiving machine 112 in FIG. 1A.

In other alternative, embodiments, the message size $\kappa$ is known to Eve.

In preferred embodiments, each scatter transmission should use a new lock and new noise. For example, if due to a failed transmission, Alice or Bob generated new noise but transmitted the same values of $a_1 \oplus m_1 \ldots a_\kappa \oplus m_\kappa$ and $b_1 \oplus m_1 \ldots b_\kappa \oplus m_\kappa$, and $b_1 \oplus a_1 \oplus m_1 \ldots b_\kappa \oplus a_\kappa \oplus m_\kappa$, then Eve could run a matching or correlation algorithm between the scatters $\mathcal{S}$, $\mathcal{T}$ or $\mathcal{U}$ in order to extract a permutation of message $m_1 \ldots m_\kappa$. During any kind of failed transmission, Alice and Bob should generate new locks from their respective random noise generators, just as they have to do for every iteration of the while loop in process 6.

In process 6, Alice's lock $a_1 \ldots a_\kappa$ is generated from her random noise generator. Hence, for every $(x_1, \ldots, x_\kappa) \in \{0,1\}^\kappa$, the probability $P(a_1 \oplus m_1 = x_1, \ldots a_\kappa \oplus m_\kappa = x_\kappa) = 2^{-\kappa}$. Similarly, Bob's lock $b_1 \ldots b_\kappa$ is generated from his random noise generator, so the probability $P(b_1 \oplus m_1 = x_1, \ldots b_\kappa \oplus m_\kappa = x_\kappa) = 2^{-\kappa}$ for every $(x_1, \ldots, x_\kappa) \in \{0,1\}^\kappa$.

Although the invention(s) have been described with reference to specific embodiments, $\pi$ will be understood by those skilled in the art that various changes may be made and equivalents may be substituted for elements thereof without departing from the true spirit and scope of the invention. In addition, modifications may be made without departing from the essential teachings of the invention.

REFERENCES

[1] Wikipedia. Transmission Control Protocol/Internet Protocol. en.m.wikipedia.org/wiki/TCP_IP

[2] Claude Shannon. Communication Theory of Secrecy Systems. 1949.

[3] Charles H. Bennett and Gilles Brassard. Quantum cryptography: Public key distribution and coin tossing. In Proceedings of IEEE International Conference on Computers, Systems and Signal Processing. 175, 175-179. New York, 1984.

[4] Charles H. Bennett, Francois Bessette, Gilles Brassard, Louis Salvail and John Smolin. Experimental Quantum Cryptography. Journal of Cryptology. 5, No. 1, 3-28, 1992.

[5] P.D. Townsend, J.G. Rarity and P.R. Tapster. Single photon interference in a 10 km long optical fibre interferometer. Electronic Letters. 29, No. 7, 634-635, April 1993.

[6] P.D. Townsend, J.G. Rarity and P.R. Tapster. Enhanced single photon fringe visibility in a 10 km long prototype quantum cryptography channel. Electronic Letters. 29, No. 14, 1291-1293, July 1993.

[7] Gilbert Vernam. Cipher printing telegraph systems for secret wire and radio telegraphic communications. J. Americ. Inst. Elect. Eng. 55, 109-15, 1926.

[8] Alan M. Turing. On computable numbers, with an application to the Entscheidungsproblem. Proc. London Math. Soc. Series 2 42 (Parts 3 and 4), 230-265, 1936. A correction, ibid. 43, 544-546, 1937.

[9] Andre Stefanov, Nicolas Gisin, Olivier Guinnard, Laurent Guinnard, and Hugo Zbinden. Optical quantum random number generator. Journal of Modern Optics, 47(4): 595 598, 2000.

[10] Mario Stipcevic and B. Medved Rogina. Quantum random number generator based on photonic emission in semiconductors. Review of Scientific Instruments. 78, 045104: 1-7, 2007.

[11] Simon Kochen and Ernst P. Specker. The Problem of Hidden Variables in Quantum Mechanics Journal of Mathematics and Mechanics (now Indiana Univ. Math Journal) 17 No. 1, 59-87, 1967.

[12] John Conway and Simon Kochen. The Strong Free Will Theorem. Notices of the American Mathematical Society. 56(2), 226-232, February 2009.

[13] NIST. Advanced Encryption Standard (AES), FIPS 197. November 2001. csrc.nist.gov/publications/fips/fips197/fips-197.pdf

[14] Ross Anderson, Eli Biham, Lars Knudsen. A Proposal for the Advanced Encryption Standard. www.cl.cam.a-c.uk/ ~rja14/Papers/serpent.pdf www.cl.cam.ac.uk/~rja14/serpent.html

[15] R.L. Rivest, A. Shamir, and L. Adleman. A method for obtaining digital signatures and public-key cryptosystems. Communications of the ACM. 21, 120 126, 1978.

[16] Stephen Cook. The P VS NP Problem. www. claymath. org/sites/default/files/pvsnp.pdf

[17] Klint Finley. Chinese Supercomputer Is Still the Worlds Most Powerful. Wired Magazine. Nov. 18, 2013.

[18] A.F. Webster and S.E. Tavares. On the Design of S-Boxes. Advances in Cryptology. CRYPTO 85 Proceedings. LNCS 218. Springer, 523-534, 1986.
[19] NIST. FIPS-180-2: Secure Hash Standard, August 2002. www.itl.nist gov/ fipspubs/.
[20] Guido Bertoni, Joan Daemen, Michael Peeters, Gilles Van Assche. Keccak Reference 3.0 2011. keccak.noekeon org/ en.wikipedia org/wiki/Keccak
[21] Jean-Philippe Aumasson, Samuel Neves, Zooko Wilcox-O'Hearn, Christian Winnerlein. BLAKE. 131002.net/blake/. wikipedia. org/wiki/BLAKE_(hash_function)
[22] Praveen Gauravaram, Lars Knudsen, Krystian Matusiewicz, Florian Mendel, Christian Rechberger, Martin Schlf-fer, and Sren S. Thomsen. Grstl a SHA-3 candidate. www. groestl. info www.groestl.info/Groestl.pdf
[23] Hongjun Wu. The Hash Function JH. 2011. ehash iaik. tugraz. at/wiki/JH www3.ntu. edu.sg/home/wuhj/research/jh/jh_round3.pdf
[24] Niels Ferguson, Stefan Lucks, Bruce Schneier, Doug Whiting, Mihir Bellare, Tadayoshi Kohno, Jon Callas, Jesse Walker. The Skein Hash Function Family. 2010. www.schneier.com/skein1.3.pdf en.wikipedia.org/wiki/Skein_(hash_function)
[25] Thomas Bayes. An essay towards solving a problem in the doctrine of chances. Philosophical Transactions of the Royal Society of London. 53, 370-418, 1764.
[26] William Feller. An Introduction to Probability Theory and Its Applications. Volume II. John Wiley. 1966.
[27] Harald Cramer. Mathematical Methods of Statistics. Princeton University Press. 1946.
[28] Abraham De Moivre. The Doctrine of Chances: or, A Method of Calculating the Probabilities of Events in play. 1st Edition London, 1718; 2nd edition 1738; 3rd edition 1756.
[29] Ralph C. Merkle. Secure Communications over Insecure Channels. Communications of the ACM. 21 (4), 294299, April 1978.
[30] Whitfield Diffie and Martin Hellman. New directions in cryptography. IEEE Transactions on Information Theory 22, 644-654, 1976.
[31] Mihir Bellare, Ran Canetti and Hugo Krawczyk. Keying Hash Functions for Message Authentication. Advances in Cryptology —Crypto 96 Proceedings. LNCS 1109, N. Koblitz ed., Springer, 1996.
[32] Mark Wegman and J. Lawrence Carter. New Hash Functions and Their Use in Authentication and Set Equality. Journal of Computer and System Sciences. 22, 265-279, 1981.

The invention claimed is:

1. A process comprising:
generating noise from a non-deterministic generator of a machine of a first party, the machine of the first party having a processor system and a memory system, the processor system including one or more processors;
generating one or more keys from the non-deterministic generator of the machine of the first party; and
hiding the one or more keys inside the noise, by the machine of the first party, by at least placing the one or more keys at locations, based on a shared secret map and the noise at other locations, based on the shared secret map; and
transmitting, by the machine of the first party, the one or more keys while hidden in the noise, to a machine of a second party that is capable of generating the shared secret map.

2. The process of claim 1, wherein each of the one or more keys have a plurality of parts, the process further comprising:
selecting, by the machine, a hiding location for each part of the plurality of parts of the one or more keys; storing each part of the plurality of parts of the one or more keys in the hiding location that was selected;
storing, by the machine, the noise in remaining locations that are unoccupied by parts of the one or more keys.

3. The process of claim 1 further comprising: generating, by the machine, the noise based at least on a behavior of photons.

4. The process of claim 3 further comprising: emitting said photons from a light emitting diode.

5. The process of claim 3 further comprising:
generating, by the machine, the noise based at least on arrival times of emitted photons.

6. The process of claim 3 further comprising:
generating, by the machine, the noise based at least on threshold times, wherein if a photon of the photons arrives prior to the threshold time, a bit is set to one value and if the photon of the photons arrives after the threshold time the bit is set to another value.

7. The process of claim 1 further comprising:
generating, by the machine, the one or more keys based at least on a behavior of photons.

8. The process of claim 7 further comprising: emitting the photons from a light emitting diode.

9. The process of claim 7, wherein the generating of the one or more keys at least partly depends on at least photocurrent values in a photodiode compared to an average value of the photocurrent.

10. The process of claim 7, wherein said photons are absorbed by a photo detector.

11. The process of claim 10, wherein said photons are absorbed by a phototransistor.

12. The process of claim 10, wherein said photons are absorbed by a photodiode.

13. The process of claim 1 further comprising:
the second party receives the one or more keys, which were hidden inside the noise;
the second party computes the shared secret map from a secret to find the hiding locations of the parts of the one or more keys;
the second party extracts the one or more keys from the noise with the hiding locations.

14. The process of claim 1 further comprising:
the first party having a distinct authentication key extracted from the hidden one or more keys that were hidden in the noise;
the first party applying, by the machine, a one-way hash function to a combination of the authentication key and the one or more keys that were hidden in the noise;
the first party also transmitting the output of the hash function to the second party.

15. The process of claim 1, where in there are at least twice as many noise bits than bits storing the one or more keys.

16. An information process comprising:
generating noise from a non-deterministic generator of a machine of a first party, the noise having a probability distribution; encrypting data to form encrypted data;
hiding the encrypted data inside the noise with the machine of the first party, the machine having a processor system and a memory system, by at least placing, by the machine of the first party, the encrypted data at a first set of locations based on a shared secret map;

placing, by the machine of the first party, the noise at a second set of locations that is different from the first set of locations, the second set of locations being based on the shared secret map;

the encrypted data having a probability distribution, wherein the probability distribution of the encrypted data is close enough to the probability distribution of the noise, that a hacker would not be able to distinguish the noise from the encrypted data; and transmitting, by the machine of the first party, the encrypted data while hidden in the noise, to a machine of a second party that has the shared secret map.

17. The information process of claim 16, where in there are at least twice as many noise bits than bits storing the one or more keys.

18. An information process comprising:

generating noise from a non-deterministic generator, the noise having a probability distribution; hiding data inside the noise with a machine, the machine having a processor system and a memory system, the hiding of the data being performed by at least placing, by the machine of the first party, the data at a first set of locations being based on a shared secret map, and placing, by the machine of the first party, the noise at a second set of locations that is different from the first set of locations, the second set of locations being based on the shared secret map;

the data having a probability distribution, wherein the probability distribution of the data is the same as the probability distribution of the noise; and transmitting, by the machine of the first party, the data while hidden in the noise, to a machine of a second party that is capable of generating the shared secret map.

19. The process of claim 18 further comprising:

hiding, by the machine, metadata in the noise, the metadata pertains to the hidden data;

wherein said metadata contains at least some internet protocol information.

20. The process of claim 18 further comprising:

generating the noise based at least on a behavior of photons.

21. The process of claim 20 further comprising: emitting the photons from a light emitting diode.

22. The process of claim 20 further comprising: generating the noise at least partly depends on photocurrent values in a photodiode compared to an average value of the photocurrent.

23. The process of claim 20 wherein said photons are absorbed by a photodetector.

24. The process of claim 18 further comprising:

the first party selecting a hiding location for each part of the data;

the first party storing, by the machine each part of the data in the hiding location that was selected;

the first party storing, by the machine, the noise in remaining locations that are unoccupied by parts of the data.

25. The process of claim 24 further comprising:

the first party transmitting, by the machine, the hidden data inside the noise to the second party;

the second party computing the secret map, function based on a secret, to find the hiding locations of the parts of the data;

the second party extracting the data from the noise based on the map.

26. The information process of claim 18, where in there are at least twice as many noise bits than bits storing the one or more keys.

27. A process comprising:

generating noise by a machine-implemented non-deterministic generator;

encrypting data with a machine, therein creating encrypted data;

the machine having a processor system and a memory system, the processor system including one or more processors;

hiding, by the processor system, the encrypted data inside the noise by at least a first party selecting, by the processor system, a hiding location for each part of the encrypted data based on a shared secret map;

the first party storing, by the processor system, each part of the encrypted data in the hiding location that was selected;

the first party storing, by the processor system, the noise in remaining locations that are unoccupied by parts of the encrypted data, the remaining locations being based on the shared secret map; and transmitting, by the machine of the first party, the encrypted data while hidden in the noise, to a machine of a second party that has the shared secret map.

28. The process of claim 27 wherein a block cipher encrypts said data.

29. The process of claim 27 further comprising:

the first party transmitting, by the machine, the encrypted data that was hidden inside the noise to a second party;

the second party computes the shared secret map from a secret to find the hiding locations of the parts of the encrypted data;

the second party extracting the encrypted data from the noise based on the shared secret map.

30. The process of claim 29 further comprising:

the second party further encrypting the extracted encrypted data;

wherein further encrypting the extracted encrypted data is called twice encrypted data;

the second party selecting a hiding location for each part of the twice encrypted data;

the second party storing each part of the twice encrypted data in the selected hiding location;

the second party storing new noise in the remaining locations that are unoccupied by parts of the twice encrypted data.

31. The process of claim 30 further comprising:

the second party transmitting the twice encrypted data that was hidden inside the new noise to the first party;

the first party computes, by the machine, a shared secret map to find the hiding locations of the parts of the twice encrypted data;

the first party, by the machine, extracting the twice encrypted data from the new noise based on the map;

the first party removing the first party's encryption from the twice encrypted data;

wherein the removed first party's encryption from the twice encrypted data is called second party encrypted data.

32. The process of claim 31 further comprising:

the first party selecting, by the machine, a hiding location for each part of the second party encrypted data;

the first party storing, by the machine, each part of the second party encrypted data in the selected hiding location;

the first party storing, by the machine, new noise in the remaining locations that are unoccupied by parts of the second party encrypted data;

the first party transmitting, by the machine, the second party encrypted data, hidden inside the new noise, to the second party.

33. The process of claim 27, wherein a processor executes a one-way hash function.

34. The process of claim 27 further comprising:
generating the noise based at least on a behavior of photons.

35. The process of claim 34 further comprising:
generating the noise based at least on threshold times.

36. The process of claim 34 further comprising:
comparing photocurrent values in a photodetector to an average value of the photocurrent.

37. The process of claim 34 further comprising: emitting the photons from a light emitting diode.

38. The process of claim 27, where in there are at least twice as many noise bits than bits storing the one or more keys.

39. A machine-implemented method comprising:
a first machine receiving a communication having one or more keys that are hidden amongst noise at predetermined locations based on a shared secret map, and the noise being stored in predetermined locations, the communication having originated from a second machine having the shared secret map, the noise having been generated by a nondeterministic generator;

the first machine having a processor system and a memory system, the processor system including one or more processors;

computing, at the first machine, the shared secret map, based on stored machine instructions, to find the predetermined locations where parts of the one or more keys, were previously stored, by the sender second machine, and currently are located amongst the predetermined locations storing noise;

extracting, by the first machine, the one or more keys from the predetermined locations that store the one or more keys, from amongst the predetermined locations that store the noise, based on the shared secret map.

40. The machine-implemented method of claim 39, where in there are at least twice as many noise bits than bit storing the one or more keys.

41. A machine-implemented method comprising:
encrypting data with a machine of a first party, the machine having a processor system and a memory system, the processor system including one or more processors;

generating noise with a non-deterministic generator of the machine;

and hiding, by the processor system, the encrypted data inside the noise, by at least designating, by the processor system, some locations within a set of data for storing noise, based on a shared secret map, and designating, by the processor system, some locations within the set of noise for storing the encrypted data, based on the shared secret map; and storing by the processor system the encrypted data in the locations designated for the encrypted data and storing, by the processor system, the noise in locations designated for noise, when the set of data is assembled, the locations designated for the encrypted data being mixed within the locations designated for noise, so as to obscure the encrypted data; and transmitting, by the machine of the first party, the encrypted data while hidden in the noise, to a machine of a second party that is capable of generating the shared secret map.

42. The method of claim 41, wherein said one or more processors execute a one-way hash function.

43. The machine-implemented method of claim 41, where in there are at least twice as many noise bits than bits storing the one or more keys.

44. A machine-implemented method comprising:
generating noise with a non-deterministic generator of a machine of a first party;

the machine having a processor system and a memory system, the processor system including one or more processors;

encrypting data with the machine of the first party;

the machine of the first party hiding, by the processor system, the encrypted data inside the noise, by at least designating some locations, based on a shared secret map, within a set of data for storing noise, and designating some locations, by the machine of the first party, based on the shared secret map, within the set of data for storing the encrypted data, and storing by the processor system the encrypted data in the locations designated for the encrypted data and storing by the processor system the noise in locations designated for noise, when the set of data is assembled, the locations designated for the encrypted data being mixed within the locations designated for noise, so as to obscure the encrypted data;

wherein the noise has a probability distribution and the encrypted data has the same probability distribution as the noise; and transmitting, by the machine of the first party, the set of data after being assembled, to a machine of a second party that has the shared secret map.

45. The method of claim 44 wherein a block cipher encrypts said data.

46. The method of claim 44 further comprising:
the first party selecting, by the machine, a hiding location for each part of the encrypted data;

the first party storing, by the machine, each part of the encrypted data in the hiding location that was selected;

the first party storing, by the machine, the noise in the remaining locations that are unoccupied by parts of the encrypted data.

47. The machine-implemented method of claim 44, where in there are at least twice as many noise bits than bits storing the one or more keys.

48. An information system comprising:
a processor system, the processor system including one or more processors and a memory system storing one or more machine instructions, which when invoked cause the processor system to implement a method including at least, the information system being associated with a first party generating noise from a non-deterministic generator of the information system associated with the first party;

generating one or more keys from the non-deterministic generator of the information system associated with the first party;

and hiding the one or more keys inside the noise by the machine, the machine having a processor system and a memory system, the processor system including one or more processors the one or more keys being located in the noise at locations based on a shared secret map; and transmitting, by the information system associated with the first party, the one or more keys while hidden in the noise, to a machine of a second party that has the shared secret map.

49. The system of claim 48 wherein the generating of the noise has a probability distribution and the generating of the one or more keys has a probability distribution, which is the same as the probability distribution of the generating of the noise.

50. The system of claim 49 each of the one or more keys have a plurality of parts, the system furthercomprising:

selecting, by the machine, a hiding location for each part of the plurality of parts of the one or more keys;

storing, by the machine, each part of the plurality of parts of the one or more keys in the hiding location that was selected;

storing, by the machine, the noise in remaining locations that are unoccupied by parts of the one or more keys.

51. The system of claim 48 further comprising: generating the noise based at least on a behavior of photons.

52. The system of claim 51 further comprising: emitting said photons from a light emitting diode.

53. The system of claim 48 further comprising:

generating the one or more keys based at least on a behavior of photons.

54. The system of claim 53 further comprising: emitting the photons from a light emitting diode.

55. The system of claim 53, wherein said photons are absorbed by a photodetector.

56. The information system of claim 48, where in there are at least twice as many noise bits than bits storing the one or more keys.

57. An information system comprising:

a machine of a first party, the machine of the first party including an interface that receives a communication having one or more keys that are hidden inside noise at predetermined locations for storing the one or more keys, where the noise is stored at predetermined locations for storing noise, the predetermined locations for storing the key being chosen at a machine of a second party, so as to be deterministically determinable based on a shared secret map that is shared by the first party and the second party, the noise having been generated from a machine-implemented nondeterministic generator;

the machine of the first party having a processor system and a memory system, the processor system including one or more processors;

the machine of the first party storing machine instructions, which when implemented compute a map to find the predetermined locations for storing the key, where parts of the one or more keys are located amongst the predetermined locations within the noise is stored, based on the shared secret map;

the machine of the first party extracting the predetermined locations for storing the one or more keys from amongst the predetermined locations for storing the noise, based on the shared secret map, the communication originating from the machine of the second party having the shared secret map;

the one or more keys having a probability distribution, wherein the probability distribution of the one or more keys is close enough to the probability distribution of the noise, that a hacker would not be able to distinguish the noise from the one or more keys.

58. The information system of claim 57, where in there are at least twice as many noise bits than bits storing the one or more keys.

59. A machine-implemented method comprising:

generating noise with a nondeterministic generator of a machine of a first party;

the machine of the first party having a processor system and a memory system, the processor system including one or more processors; encrypting data with the machine;

the machine of the first party hiding, by the processor system, the encrypted data inside the noise, by at least designating some locations, based on a shared secret map, within a set of data for storing noise, and designating some locations, by the machine of the first party, based on the shared secret map, within the set of data for storing the encrypted data, and storing by the processor system the encrypted data in the locations designated for the encrypted data and storing by the processor system the noise in locations designated for noise, when the set of data is assembled, the locations designated for the encrypted data being mixed within the locations designated for noise, so as to obscure the encrypted data; and transmitting the set of data, after the set of data is assembled, to a second party capable of generating the shared secret map.

* * * * *